(12) United States Patent
Song et al.

(10) Patent No.: US 11,458,712 B2
(45) Date of Patent: Oct. 4, 2022

(54) COMPOSITE CRYSTAL FLOORING AND MANUFACTURING METHOD THEREOF

(71) Applicant: ZHEJIANG YONGYU HOME FURNISHINGS CO., LTD., Zhejiang (CN)

(72) Inventors: Jiangang Song, Huzhou (CN); Jinsong Wang, Huzhou (CN); Jiajin Fu, Huzhou (CN); Peng Yan, Huzhou (CN)

(73) Assignee: ZHEJIANG YONGYU HOME FURNISHINGS CO., LTD., Huzhou (CN)

( * ) Notice: Subject to any disclaimer, the term of this patent is extended or adjusted under 35 U.S.C. 154(b) by 0 days.

(21) Appl. No.: 17/192,847

(22) Filed: Mar. 4, 2021

(65) Prior Publication Data

US 2022/0203664 A1 Jun. 30, 2022

(30) Foreign Application Priority Data

Dec. 31, 2020 (CN) .......................... 202011640866.0

(51) Int. Cl.
*B32B 27/20* (2006.01)
*B29C 48/21* (2019.01)
(Continued)

(52) U.S. Cl.
CPC ........ *B32B 27/205* (2013.01); *B29C 35/0805* (2013.01); *B29C 44/20* (2013.01);
(Continued)

(58) Field of Classification Search
None
See application file for complete search history.

(56) References Cited

U.S. PATENT DOCUMENTS

| 2016/0177579 A1* | 6/2016 | Fang ........................ C08J 9/103 521/97 |
| 2019/0001543 A1 | 1/2019 | Dai |
| 2019/0016865 A1* | 1/2019 | Zhou ...................... B29C 43/40 |

FOREIGN PATENT DOCUMENTS

| CN | 102817460 A | * 12/2012 |
| CN | 102817460 B | 4/2015 |

(Continued)

OTHER PUBLICATIONS

Song, J., Coextrusions SPC Foamed Floor, Dec. 31, 2019, machine translation of CN 110626027 (Year: 2019).*

(Continued)

*Primary Examiner* — Chinessa T. Golden
(74) *Attorney, Agent, or Firm* — Metis IP LLC

(57) ABSTRACT

Embodiments of the present disclosure disclose a composite crystal flooring. The composite crystal flooring may have a multi-layer structure. The composite crystal flooring may include a substrate layer. The substrate layer may include at least a first structural layer, a second structural layer, and a third structural layer. The second structural layer may be located between the first structural layer and the third structural layer. A foaming density of the second structural layer may be less than 1.1 grams per cubic millimeter. Components of the second structural layer may include polyvinyl chloride, one or more inorganic fillers, at least one foaming agent, at least one foaming regulator, at least one lubricating agent, and at least one stabilizer. The one or more inorganic fillers may include modified fly ash, hollow glass microbeads, and composite calcium. The composite crystal flooring with a low density may have good thermal stability and rigidity.

19 Claims, 5 Drawing Sheets

(51) Int. Cl.
  *B29C 48/91* (2019.01)
  *B29C 48/00* (2019.01)
  *B29C 35/08* (2006.01)
  *B29C 44/20* (2006.01)
  *B32B 5/18* (2006.01)
  *B32B 25/04* (2006.01)
  *B32B 25/16* (2006.01)
  *B32B 25/18* (2006.01)
  *B32B 27/06* (2006.01)
  *B32B 27/30* (2006.01)
  *C08L 27/06* (2006.01)
  *E04F 15/10* (2006.01)
  *B29K 27/06* (2006.01)
  *B29K 105/04* (2006.01)
  *B29K 105/16* (2006.01)
  *B29K 509/08* (2006.01)
  *B29L 31/00* (2006.01)

(52) U.S. Cl.
  CPC .......... *B29C 48/0011* (2019.02); *B29C 48/21* (2019.02); *B29C 48/91* (2019.02); *B32B 5/18* (2013.01); *B32B 25/045* (2013.01); *B32B 25/16* (2013.01); *B32B 25/18* (2013.01); *B32B 27/065* (2013.01); *B32B 27/302* (2013.01); *C08L 27/06* (2013.01); *E04F 15/107* (2013.01); *B29C 2035/0822* (2013.01); *B29K 2027/06* (2013.01); *B29K 2105/04* (2013.01); *B29K 2105/165* (2013.01); *B29K 2509/08* (2013.01); *B29K 2995/0017* (2013.01); *B29K 2995/0087* (2013.01); *B29L 2031/732* (2013.01); *B32B 2250/03* (2013.01); *B32B 2250/246* (2013.01); *B32B 2255/10* (2013.01); *B32B 2264/101* (2013.01); *B32B 2264/1054* (2020.08); *B32B 2264/2032* (2020.08); *B32B 2266/0235* (2013.01); *B32B 2307/308* (2013.01); *B32B 2307/4023* (2013.01); *B32B 2307/554* (2013.01); *B32B 2307/72* (2013.01); *B32B 2419/04* (2013.01)

(56) References Cited

FOREIGN PATENT DOCUMENTS

| CN | 105694287 A | | 6/2016 | |
|----|-------------|---|--------|---|
| CN | 106188959 A | * | 12/2016 | |
| CN | 107936415 A | | 4/2018 | |
| CN | 110615955 A | | 12/2019 | |
| CN | 110626027 A | * | 12/2019 | .......... B32B 27/065 |
| CN | 110626027 A | | 12/2019 | |
| EP | 2735646 A1 | | 5/2014 | |
| EP | 3643491 B1 | | 4/2021 | |
| WO | 2018201309 A1 | | 11/2018 | |

OTHER PUBLICATIONS

Liu, S., Fly Ash Glass Micro-Ball Filled PVC Microfoamed Floor, Dec. 12, 2012, machine translation of CN 102817460 (Year: 2012).*
Shi, H., Environmentally Friendly Wear Resisting Waterproof Polyvinylchloride Foam, Dec. 7, 2016, machine translation of CN 106188959 (Year: 2016).*
The Extended European Search Report in European Application No. 21168278.6 dated Oct. 6, 2021, 7 pages.
International Search Report in PCT/CN2021/143471 dated Mar. 9, 2022, 4 pages.
Written Opinion in PCT/CN2021/143471 dated Mar. 9, 2022, 4 pages.

* cited by examiner

100

200

COMPOSITE CRYSTAL FLOORING AND MANUFACTURING METHOD THEREOF

CROSS-REFERENCE TO RELATED APPLICATIONS

This application claims priority of Chinese Patent Application No. 202011640866.0, filed on Dec. 31, 2020, the contents of which are hereby incorporated in reference.

TECHNICAL FIELD

The present disclosure relates to flooring, and more specifically, relates to a composite crystal flooring and a manufacturing method thereof.

BACKGROUND

Common floorings mainly include wood-plastic floorings and stone-plastic floorings. A manufacturing process of the wood-plastic flooring is complicated. Therefore, a production efficiency of the wood-plastic flooring is low. In addition, the wood-plastic flooring has a poor thermal stability. The wood-plastic flooring is prone to warping and deforming during use. Although the stone-plastic flooring has a better stability, a density of the stone-plastic flooring is higher and a corresponding transportation cost is higher. Therefore, it is necessary to provide a flooring with a low density and a good stability.

SUMMARY

In an aspect of the present disclosure, a composite crystal flooring is provided. The composite crystal flooring may have a multi-layer structure. The composite crystal flooring may include a substrate layer. The substrate layer may include at least a first structural layer, a second structural layer, and a third structural layer. The second structural layer may be located between the first structural layer and the third structural layer. As used herein, a foaming density of the second structural layer may be less than 1.1 grams per cubic millimeter. Components of the second structural layer may include polyvinyl chloride, one or more inorganic fillers, at least one foaming agent, at least one foaming regulator, at least one lubricating agent, and at least one stabilizer. The one or more inorganic fillers may include modified fly ash, hollow glass microbeads, and composite calcium.

In some embodiments, the components of the second structural layer may include 90 to 110 parts by weight of the polyvinyl chloride, 100 to 200 parts by weight of the one or more inorganic fillers, 1.6 to 2.1 parts by weight of the at least one foaming agent, 12 to 15 parts by weight of the at least one foaming regulator, 1.7 to 2.1 parts by weight of the at least one lubricating agent, and 6.0 to 8.0 parts by weight of the at least one stabilizer.

In some embodiments, the at least one lubricating agent may include an internal lubricating agent and an external lubricating agent. The internal lubricating agent may include stearic acid. Parts by weight of the stearic acid may be within a range of 0.9 to 1.1. The external lubricating agent may include polyethylene wax. Parts by weight of the polyethylene wax may be within a range of 0.8 to 1.0.

In some embodiments, the one or more inorganic fillers of the second structural layer may include 81 to 89 parts by weight of the modified fly ash, 3 to 7 parts by weight of the hollow glass microbeads, and 8 to 12 parts by weight of the composite calcium.

In some embodiments, the modified fly ash may include microbeads. A weight content of the microbeads in the modified fly ash may be within a range of 40% to 60%. A mesh number of the modified fly ash may be within a range of 325 to 400.

In some embodiments, components of the composite calcium may include at least heavy calcium carbonate and light calcium carbonate. A mesh number of the heavy calcium carbonate may be within a range of 800 to 1250. A mesh number of the light calcium carbonate may be within a range of 800 to 1250. A weight content of the heavy calcium carbonate may be within a range of 60% to 80%, and a weight content of the light calcium carbonate may be within a range of 20% to 40%.

In some embodiments, the at least one foaming agent may include a yellow foaming agent and a white foaming agent. The yellow foaming agent may include azodicarbonamide, and the white foaming agent may include sodium bicarbonate.

In some embodiments, the at least one foaming regulator may include acrylics.

In some embodiments, when a temperature change is less than 80 degrees centigrade, a degree of deformation of the first structural layer and a degree of deformation of the third structural layer may be less than 0.065%.

In some embodiments, components of the first structural layer may include polyvinyl chloride, one or more inorganic fillers, at least one lubricating agent, at least one stabilizer, acrylonitrile butadiene styrene (ABS) resin, and at least one plasticizer. As used herein, components of the one or more inorganic fillers of the first structural layer may include the heavy calcium carbonate, the hollow glass microbeads, or the like, or any combination thereof. A ratio between parts by weight of the hollow glass microbeads to parts by weight of the one or more inorganic fillers may not be greater than 35%.

In some embodiments, the first structural layer may include 90 to 110 parts by weight of the polyvinyl chloride, 270 to 330 parts by weight of the one or more inorganic fillers, 0.8 to 2.6 parts by weight of the at least one lubricating agent, 3.0 to 6.0 parts by weight of the at least one stabilizer, 8 to 10 parts by weight of the ABS resin, and 5 to 15 parts by weight of the at least one plasticizer.

In some embodiments, components of the third structural layer may include polyvinyl chloride, one or more inorganic fillers, at least one lubricating agent, at least one stabilizer, acrylonitrile butadiene styrene (ABS) resin, and at least one plasticizer. As used herein, components of the one or more inorganic fillers of the third structural layer may include the heavy calcium carbonate, the hollow glass microbeads, or the like, or any combination thereof. A ratio of parts by weight of the hollow glass microbeads to parts by weight of the one or more inorganic fillers may not be greater than 35%.

In some embodiments, the third structural layer may include 90 to 110 parts by weight of the polyvinyl chloride, 270 to 330 parts by weight of the one or more inorganic fillers, 0.8 to 2.6 parts by weight of the at least one lubricating agent, 3.0 to 6.0 parts by weight of the at least one stabilizer, 8 to 10 parts by weight of the ABS resin, and 5 to 15 parts by weight of the at least one plasticizer.

In some embodiments, the composite crystal flooring may further include a decorative layer disposed on the substrate layer. The decorative layer may include an ultraviolet (UV) coating layer, a wear-resistant layer, a color film layer, or the like, or any combination thereof.

In some embodiments, a density of the composite crystal flooring may be within a range of 1.285 to 1.45 grams per cubic millimeter.

In some embodiments, when a temperature returns to 23±2 degrees centigrade after the composite crystal flooring is heated at 80 degrees centigrade for 6 hours, a thermal dimensional change rate of the composite crystal flooring may be with a range of 0.065% to 0.15%.

In another aspect of the present disclosure, a method for manufacturing the composite crystal flooring is provided. The method may include the following operations. The operation may include pretreating raw materials of a first structural layer, a second structural layer, and a third structural layer, respectively. The operation may also include sending the pretreated raw materials of the first structural layer, the second structural layer, and the third structural layer into a coextrusion extruder. The operation may further include forming a semi-manufactured product of the substrate layer by coextruding and foaming the pretreated raw materials.

In some embodiments, the method may further include performing a cooling and pre-sizing treatment on the semi-manufactured product of the substrate layer.

In some embodiments, the method may further include heating the substrate layer to a third preset temperature using infrared after the substrate layer is treated by a set of calendaring rollers.

In some embodiments, the method may further include obtaining the composite crystal flooring by rolling the substrate layer heated to the third preset temperature using infrared, the color film layer, and the wear-resistant layer using the calendaring rollers through one-step forming.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
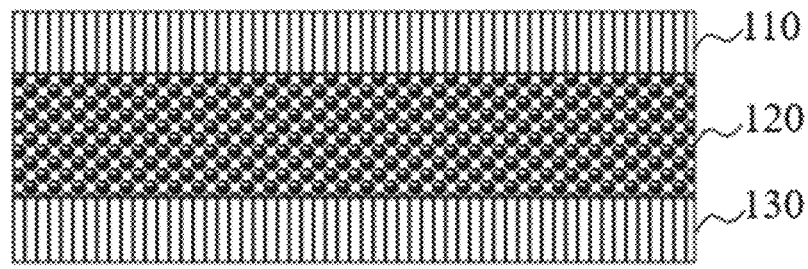
FIG. 1 is a cross-sectional view illustrating a substrate layer of a composite crystal flooring according to some embodiments of the present disclosure.

In order to more clearly illustrate the technical solutions of the embodiments of the present disclosure, the following will briefly introduce the accompanying drawings needed in the description of the embodiments. Obviously, the drawings in the following description are only some examples or embodiments of the present disclosure. Various modifications to the disclosed embodiments will be readily apparent to those skilled in the art, and the general principles defined herein may be applied to other embodiments and applications without departing from the spirit and scope of the present disclosure. Unless obviously obtained from the context or the context illustrates otherwise, the same numeral in the drawings refers to the same structure or operation.

As used herein, the singular forms "a," "an," and "the" may be intended to include the plural forms as well, unless the context clearly indicates otherwise. Generally, the terms "comprise," and "include" when used in this disclosure, specify the presence of stated operations and elements, but do not preclude the presence or addition of one or more other operations, elements thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

FIG. 1 is a cross-sectional view illustrating a substrate layer of a composite crystal flooring according to some embodiments of the present disclosure. In some embodiments, the substrate layer refers to a coextruded and foamed substrate layer.

In some embodiments, the composite crystal flooring may be disposed in a multi-layer structure. For example, the composite crystal flooring may include a coextruded and foamed substrate layer 100. As another example, the composite crystal flooring may include a coextruded and foamed substrate layer 100 and a decorative layer 200 disposed on the coextruded and foamed substrate layer 100. As still another example, the composite crystal flooring may include a coextruded and foamed substrate layer 100, a decorative layer 200 disposed on the coextruded and foamed substrate layer 100, and a back cushion layer disposed under the coextruded and foamed substrate layer 100. The composite crystal flooring may also include other structural layers. More description regarding the decorative layer 200 and the back cushion layer may be found in FIG. 2, FIG. 3, and the descriptions thereof.

The coextruded and foamed substrate layer 100 may include at least one first structural layer 110, at least one second structural layer 120, and at least one third structural layer 130. In some embodiments, a count of the at least one first structural layer 110 may include, but not be limited to, 1, 2, 3, etc. A count of the at least one second structural layer 110 may include, but not be limited to, 1, 2, 3, etc. A count of the at least one third structural layer 110 may include, but not be limited to, 1, 2, 3, etc. In some embodiments, the count of the at least one first structural layer 110, the count of the at least one second structural layer 120, and the count of the at least one third structural layer 130 may be the same or different.

The second structural layer 120 may be located between the first structural layer 110 and the third structural layer 130. As shown in FIG. 1, the second structural layer 120 may be located on an upper layer of the third structural layer 130, and the second structural layer 120 may be located on a lower layer of the first structural layer 110. In some embodiments, other layers may be located between the second structural layer 120 and the third structural layer 130. Alternatively, no other layers may be located between the second structural layer 120 and the third structural layer 130. In some embodiments, other layers may be located between the second structural layer 120 and the first structural layer 110. Alternatively, no other layers may be located between the second structural layer 120 and the first structural layer 110.

In some embodiments, the first structural layer 110, the second structural layer 120, and the third structural layer 130 may be formed by hot pressing molding. More descriptions regarding the hot pressing molding may be found in FIG. 4 and the descriptions thereof. In some embodiments, the second structural layer 120 may be disposed under the first structural layer 110 through a binder. In some embodiments, the second structural layer 120 may be disposed on the upper layer of the third structural layer 130 through the binder. The binder refers to a substance that binds objects to each other. For example, the binder may include a polylactide (PLA) resin, a phenol resin, or the like.

The second structural layer 120 may be a foaming layer. The foaming layer may be foamed by a foaming agent to reduce a density of the foaming layer. Therefore, the foaming layer may have a relatively small weight. More descriptions regarding hot pressing molding may be found later.

In some embodiments, a foaming density of the second structural layer 120 may be less than 1.1 grams per cubic millimeter (g/cm$^3$). In some embodiments, the foaming density of the second structural layer 120 may be less than 1.0 g/cm$^3$. In some embodiments, the foaming density of the second structural layer 120 may be less than 0.9 g/cm$^3$. In some embodiments, the foaming density of the second structural layer 120 may be less than 0.8 g/cm$^3$. In some embodiments, the foaming density of the second structural layer 120 may be less than 0.7 g/cm$^3$.

In some embodiments, the foaming density of the second structural layer 120 may be within a range of 0.7 to 1.1 g/cm$^3$. In some embodiments, the foaming density of the second structural layer 120 may be within a range of 0.75 to 1.05 g/cm$^3$. In some embodiments, the foaming density of the second structural layer 120 may be within a range of 0.8 to 1.0 g/cm$^3$. In some embodiments, the foaming density of the second structural layer 120 may be within a range of 0.85 to 0.95 g/cm$^3$. In some embodiments, the foaming density of the second structural layer 120 may be within a range of 0.88 to 0.92 g/cm$^3$.

In some embodiments, the foaming density of the second structural layer 120 may be equal to 1.1 g/cm$^3$. In some embodiments, the foaming density of the second structural layer 120 may be equal to 1.05 g/cm$^3$. In some embodiments, the foaming density of the second structural layer 120 may be equal to 1.0 g/cm$^3$. In some embodiments, the foaming density of the second structural layer 120 may be equal to 0.95 g/cm$^3$. In some embodiments, the foaming density of the second structural layer 120 may be equal to 0.9 g/cm$^3$. In some embodiments, the foaming density of the second structural layer 120 may be equal to 0.85 g/cm$^3$. In some embodiments, the foaming density of the second structural layer 120 may be equal to 0.8 g/cm$^3$. In some embodiments, the foaming density of the second structural layer 120 may be equal to 0.75 g/cm$^3$. In some embodiments, the foaming density of the second structural layer 120 may be equal to 0.7 g/cm$^3$.

In some embodiments, a diameter of a foaming hole of the second structural layer 120 may be within a range of 140 to 180 micrometers. In some embodiments, the diameter of the foaming hole of the second structural layer 120 may be within a range of 145 to 175 micrometers. In some embodiments, the diameter of the foaming hole of the second structural layer 120 may be within a range of 150 to 170 micrometers. In some embodiments, the diameter of the foaming hole of the second structural layer 120 may be within a range of 155 to 165 micrometers. In some embodiments, the diameter of the foaming hole of the second structural layer 120 may be within a range of 158 to 162 micrometers.

In some embodiments, the hardness of the second structural layer 120 may be within a range of 75 to 81 HD. In some embodiments, the hardness of the second structural layer 120 may be within a range of 76 to 80 HD. In some embodiments, the hardness of the second structural layer 120 may be within a range of 77 to 79 HD. In some embodiments, the hardness of the second structural layer 120 may be 78 HD.

In some embodiments, components of the second structural layer may include polyvinyl chloride, one or more inorganic fillers, at least one foaming agent, at least one foaming regulator, at least one lubricating agent, and at least one stabilizer. In some embodiments, the components of the second structural layer may include 90 to 110 parts by weight of the polyvinyl chloride, 100 to 200 parts by weight of the one or more inorganic fillers, 1.6 to 2.1 parts by weight of the at least one foaming agent, 12 to 15 parts by weight of the at least one foaming regulator, 1.7 to 2.1 parts by weight of the at least one lubricating agent, and 6.0 to 8.0 parts by weight of the at least one stabilizer. In some embodiments, the one or more inorganic fillers may include modified fly ash, hollow glass microbeads, and composite calcium.

In some embodiments, the parts by weight of the at least one lubricating agent may be within a range of 1.7 to 2.1. In some embodiments, the parts by weight of the at least one lubricating agent may be within a range of 1.8 to 2.0. In some embodiments, the parts by weight of the at least one lubricating agent may be 1.9.

In some embodiments, the at least one lubricating agent may include an internal lubricating agent and an external lubricating agent. In some embodiments, the internal lubricating agent may include stearic acid. In some embodiments, the external lubricating agent may include polyethylene wax. In some embodiments, the lubricating agent may include a composite lubricating agent. The composite lubricating agent may have functions of the internal lubricating agent and the external lubricating agent. For example, the composite lubricating agent may include fatty acid soaps, fatty amides, or the like. In some embodiments, the lubricating agent may include an internal lubricating agent, an external lubricating agent, and a composite lubricating agent.

In some embodiments, as for 274.25 parts by weight of the second structural layer 120, components of the second structural layer 120 may include 90 to 110 parts by weight of the polyvinyl chloride and at least one of the following components: 100 to 200 parts by weight of the one or more inorganic fillers, 0.8 to 1.0 parts by weight of the polyethylene wax, 6.0 to 8.0 parts by weight of the at least one stabilizer, 0.9 to 1.1 parts by weight of the stearic acid, 1.6 to 2.1 parts by weight of the at least one foaming agent, and 12 to 15 parts by weight of the at least one foaming regulator. For example, as for 274.25 parts by weight of the second structural layer 120, the components of the second structural layer 120 may include 90 to 110 parts by weight of the polyvinyl chloride, 100 to 200 parts by weight of the one or more inorganic fillers, 0.8 to 1.0 parts by weight of the polyethylene wax, 6.0 to 8.0 parts by weight of the at least one stabilizer, 0.9 to 1.1 parts by weight of the stearic acid, 1.6 to 2.1 parts by weight of the at least one foaming agent, and 12 to 15 parts by weight of the at least one foaming regulator.

In some embodiments, the parts by weight of the polyvinyl chloride may be within a range of 80 to 120. In some embodiments, the parts by weight of the polyvinyl chloride may be within a range of 85 to 115. In some embodiments, the parts by weight of the polyvinyl chloride may be within a range of 91 to 109. In some embodiments, the parts by weight of the polyvinyl chloride may be within a range of 92 to 108. In some embodiments, the parts by weight of the polyvinyl chloride may be within a range of 93 to 107. In some embodiments, the parts by weight of the polyvinyl chloride may be within a range of 94 to 106. In some embodiments, the parts by weight of the polyvinyl chloride may be within a range of 95 to 105. In some embodiments, the parts by weight of the polyvinyl chloride may be within a range of 96 to 104. In some embodiments, the parts by weight of the polyvinyl chloride may be within a range of 97 to 103. In some embodiments, the parts by weight of the polyvinyl chloride may be within a range of 98 to 102. In some embodiments, the parts by weight of the polyvinyl chloride may be within a range of 99 to 101. In some embodiments, the parts by weight of the polyvinyl chloride may be 100.

In some embodiments, the parts by weight of the one or more inorganic fillers may be within a range of 80 to 220. In some embodiments, the parts by weight of the one or more inorganic fillers may be within a range of 90 to 210. In some embodiments, the parts by weight of the one or more inorganic fillers may be within a range of 100 to 200. In some embodiments, the parts by weight of the one or more inorganic fillers may be within a range of 105 to 195. In some embodiments, the parts by weight of the one or more inorganic fillers may be within a range of 110 to 190. In some embodiments, the parts by weight of the one or more inorganic fillers may be within a range of 115 to 185. In some embodiments, the parts by weight of the one or more inorganic fillers may be within a range of 120 to 180. In some embodiments, the parts by weight of the one or more inorganic fillers may be within a range of 125 to 175. In some embodiments, the parts by weight of the one or more inorganic fillers may be within a range of 130 to 170. In some embodiments, the parts by weight of the one or more inorganic fillers may be within a range of 135 to 165. In some embodiments, the parts by weight of the one or more inorganic fillers may be within a range of 140 to 160. In some embodiments, the parts by weight of the one or more inorganic fillers may be within a range of 145 to 155. In some embodiments, the parts by weight of the one or more inorganic fillers may be 150.

In some embodiments, the parts by weight of the polyethylene wax may be within a range of 0.82 to 0.98. In some embodiments, the parts by weight of the polyethylene wax may be within a range of 0.84 to 0.96. In some embodiments, the parts by weight of the polyethylene wax may be within a range of 0.86 to 0.94. In some embodiments, the parts by weight of the polyethylene wax may be within a range of 0.88 to 0.92. In some embodiments, the parts by weight of the polyethylene wax may be within a range of 0.89 to 0.91.

In some embodiments, the parts by weight of the at least one stabilizer may be within a range of 6.2 to 7.8. In some embodiments, the parts by weight of the at least one stabilizer may be within a range of 6.4 to 7.6. In some embodiments, the parts by weight of the at least one stabilizer may be within a range of 6.6 to 7.4. In some embodiments, the parts by weight of the at least one stabilizer may be within a range of 6.8 to 7.2. In some embodiments, the parts by weight of the at least one stabilizer may be within a range of 6.9 to 7.1.

In some embodiments, the parts by weight of the stearic acid may be within a range of 0.92 to 1.08. In some embodiments, the parts by weight of the stearic acid may be within a range of 0.94 to 1.06. In some embodiments, the parts by weight of the stearic acid may be within a range of 0.96 to 1.04. In some embodiments, the parts by weight of the stearic acid may be within a range of 0.98 to 1.02. In some embodiments, the parts by weight of the stearic acid may be within a range of 0.99 to 1.01.

In some embodiments, the parts by weight of the at least one foaming agent may be within a range of 1.6 to 2.1. In some embodiments, the parts by weight of the at least one foaming agent may be within a range of 1.7 to 2.0. In some embodiments, the parts by weight of the at least one foaming agent may be within a range of 1.8 to 1.9. In some embodiments, the parts by weight of the at least one foaming agent may be within a range of 1.85 to 1.95.

In some embodiments, the parts by weight of the at least one foaming regulator may be within a range of 12 to 15. In some embodiments, the parts by weight of the at least one foaming regulator may be within a range of 12.5 to 14.5. In some embodiments, the parts by weight of the at least one foaming regulator may be within a range of 13 to 14. In some embodiments, the parts by weight of the at least one foaming regulator may be within a range of 13.4 to 13.6.

In some embodiments, the stabilizer refers to an agent that keeps a structure of a polymer compound stable. For example, the stabilizer may include calcium stearate, dibasic lead salt, zinc stearate, organic tins, carboxylate salts or fatty acid salts of rare earth elements, or the like. The stabilizer may also include other substances.

In some embodiments, the foaming agent refers to an agent that foams a substance (e.g., the second structural layer 120) with pores. In some embodiments, the foaming agent may include a yellow foaming agent and a white foaming agent. In some embodiments, the yellow foaming agent may include azodicarbonamide, and the white foaming agent may include sodium bicarbonate.

In some embodiments, the foaming regulator may include acrylics. In some embodiments, the acrylics may include methyl acrylate, ethyl acrylate, methyl 2-methacrylate, ethyl 2-methacrylate, or the like.

The foaming regulator may promote a plasticization process, improve an elasticity of a melt, enhance an elongation and a strength of the melt, make the plasticization more uniform, help to cover bubbles, prevent a collapse of the cells, and make the cells uniform and dense. Therefore, a foaming quality may be improved.

In some embodiments, as for 95 parts by weight of the one or more inorganic fillers, the one or more inorganic fillers may include 81 to 89 parts by weight of the modified fly ash, 3 to 7 parts by weight of the hollow glass microbeads, 8 to 12 parts by weight of the composite calcium, or the like, or any combination thereof. For example, as for 95 parts by weight of the one or more inorganic fillers, the one or more inorganic fillers may include 81 to 89 parts by weight of the modified fly ash, 3 to 7 parts by weight of the hollow glass microbeads, and 8 to 12 parts by weight of the composite calcium.

In some embodiments, the modified fly ash refers to fly ash processed by a modified treatment. In some embodiments, a modification treatment may include, but not be limited to, a fire modification, an acid modification, an alkali modification, or the like. In some embodiments, the parts by weight of the modified fly ash may be within a range of 82 to 88. In some embodiments, the parts by weight of the modified fly ash may be within a range of 83 to 87. In some embodiments, the parts by weight of the modified fly ash may be within a range of 84 to 86. In some embodiments, the parts by weight of the modified fly ash may be within a range of 84.5 to 85.5. In some embodiments, the parts by weight of the modified fly ash may be equal to 85.

In some embodiments, the modified fly ash may include microbeads. In some embodiments, components of the microbeads may mainly include silicon dioxide. In some embodiments, a mesh number of the microbeads may be the same as that of the modified fly ash. Alternatively, the mesh number of the microbeads may be different from that of the modified fly ash. For example, the mesh number of the microbeads may be smaller than that of the modified fly ash. In some embodiments, the weight content of the microbeads in the modified fly ash may be within a range of 40% to 60%. In some embodiments, the weight content of the microbeads in the modified fly ash may be within a range of 41% to 59%. In some embodiments, the weight content of the microbeads in the modified fly ash may be within a range of 42% to 58%. In some embodiments, the weight content of the microbeads in the modified fly ash may be within a range of 43% to 57%. In some embodiments, the weight content of the microbeads in the modified fly ash may be within a range of 44% to 56%. In some embodiments, the weight content of the microbeads in the modified fly ash may be within a range of 45% to 55%. In some embodiments, the weight content of the microbeads in the modified fly ash may be within a range of 46% to 54%. In some embodiments, the weight content of the microbeads in the modified fly ash may be within a range of 47% to 53%. In some embodiments, the weight content of the microbeads in the modified fly ash may be within a range of 48% to 52%. In some embodiments, the weight content of the microbeads in the modified fly ash may be within a range of 49% to 51%. In some embodiments, the weight content of the microbeads in the modified fly ash may be equal to 50%. In some embodiments, the weight content of the microbeads in the modified fly ash may be any value from 40% to 60%.

In some embodiments, the mesh number of the modified fly ash may be with a range of 325 to 400. In some embodiments, the mesh number of the modified fly ash may be with a range of 330 to 395. In some embodiments, the mesh number of the modified fly ash may be with a range of 335 to 390. In some embodiments, the mesh number of the modified fly ash may be with a range of 340 to 385. In some embodiments, the mesh number of the modified fly ash may be with a range of 345 to 380. In some embodiments, the mesh number of the modified fly ash may be with a range of 350 to 375. In some embodiments, the mesh number of the modified fly ash may be with a range of 355 to 370. In some embodiments, the mesh number of the modified fly ash may be with a range of 360 to 365.

In some embodiments, the hollow glass microbeads refer to glass microbeads with a particle diameter of 10 to 250 micrometers and a hollow and spherical structure or a quasi-spherical structure. The hollow glass microbeads with the spherical structure may have a good fluidity. The hollow glass microbreads may be used as fillers in the embodiments of the present disclosure, which may not only reduce the density of the composite crystal flooring, but also improve a creep resistance of the composite crystal flooring.

In some embodiments, the parts by weight of the hollow glass microbeads may be within a range of 3.2 to 6.8. In some embodiments, the parts by weight of the hollow glass microbeads may be within a range of 3.5 to 6.5. In some embodiments, the parts by weight of the hollow glass microbeads may be within a range of 3.8 to 6.2. In some embodiments, the parts by weight of the hollow glass microbeads may be within a range of 4 to 6. In some embodiments, the parts by weight of the hollow glass microbeads may be within a range of 4.2 to 5.8. In some embodiments, the parts by weight of the hollow glass microbeads may be within a range of 4.5 to 5.5. In some embodiments, the parts by weight of the hollow glass microbeads may be within a range of 4.8 to 5.2. In some embodiments, the part by weight of the hollow glass microbeads may be 5.

In some embodiments, the parts by weight of the composite calcium may be within a range of 8.2 to 11.8. In some embodiments, the parts by weight of the composite calcium may be within a range of 8.4 to 11.6. In some embodiments, the parts by weight of the composite calcium may be within a range of 8.6 to 11.4. In some embodiments, the parts by weight of the composite calcium may be within a range of 8.8 to 11.2. In some embodiments, the parts by weight of the composite calcium may be within a range of 9 to 11. In some embodiments, the parts by weight of the composite calcium may be within a range of 9.2 to 10.8. In some embodiments, the parts by weight of the composite calcium may be within a range of 9.4 to 10.6. In some embodiments, the parts by weight of the composite calcium may be within a range of 9.6 to 10.4. In some embodiments, the parts by weight of the composite calcium may be within a range of 9.8 to 10.2. In some embodiments, the parts by weight of the composite calcium may be 10.

In some embodiments, components of the composite calcium may include at least heavy calcium carbonate and light calcium carbonate. The weight content of the heavy calcium carbonate may be within a range of 60 to 80%, and a weight content of the light calcium carbonate may be within a range of 20% to 40%. In some embodiments, the weight content of the heavy calcium carbonate may be within a range of 62% to 78%. In some embodiments, the weight content of the heavy calcium carbonate may be within a range of 64% to 76%. In some embodiments, the weight content of the heavy calcium carbonate may be within a range of 66% to 74%. In some embodiments, the weight content of the heavy calcium carbonate may be within a range of 68% to 72%. In some embodiments, the weight content of the heavy calcium carbonate may be within a range of 69% to 71%.

In some embodiments, the mesh number of the heavy calcium carbonate may be within a range of 800 to 1250. In some embodiments, the mesh number of the heavy calcium carbonate may be within a range of 850 to 1200. In some embodiments, the mesh number of the heavy calcium carbonate may be within a range of 900 to 1150. In some embodiments, the mesh number of the heavy calcium carbonate may be within a range of 950 to 1100. In some embodiments, the mesh number of the heavy calcium carbonate may be within a range of 1000 to 1050.

In some embodiments, the weight content of the light calcium carbonate may be within a range of 22% to 38%. In some embodiments, the weight content of the light calcium carbonate may be within a range of 24% to 36%. In some embodiments, the weight content of the light calcium carbonate may be within a range of 26% to 34%, and in some embodiments, the weight content of the light calcium carbonate may be within a range of 28% to 32%. In some embodiments, the weight content of the light calcium carbonate may be within a range of 29% to 31%.

In some embodiments, the mesh number of the light calcium carbonate may be with a range of 800 to 1250. In some embodiments, the mesh number of the light calcium carbonate may be with a range of 850 to 1200. In some embodiments, the mesh number of the light calcium carbonate may be with a range of 900 to 1150. In some embodiments, the mesh number of the light calcium carbonate may be with a range of 950 to 1100. In some embodiments, the mesh number of the light calcium carbonate may be with a range of 1000 to 1050.

In some embodiments, the mesh number of the heavy calcium carbonate and the mesh number of the light calcium carbonate may be the same or different.

Amounts of the one or more inorganic fillers and other components of the second structural layer 120 may need to be controlled within a reasonable range, which may help to improve a performance of the composite crystal flooring. For example, a proper amount of the composite calcium and the hollow glass microbeads may reduce a screw torque, improve a material fluidity and a plasticization rate, and reduce a decomposition of polyvinyl chloride. Meanwhile, the composite calcium with the mesh number of 800 to 1250 may increase a density of fine of the foaming cells. The hollow glass microbeads may reduce a density of products and an amount of the at least one foaming agent, thereby effectively controlling a foaming ratio and a cell density.

The modified fly ash, the composite calcium, and the hollow glass microbeads may be added into the second structural layer 120 as fillers to avoid disadvantages (e.g., a poor dispersion, a poor compatibility, a high water absorption, etc.) when organic fibers (e.g., bamboo, chaff, straw, etc.) are used as fillers. Chemical foaming may further reduce the density of the composite crystal flooring and improve a performance of sound absorption of the composite crystal flooring.

In some embodiments, the first structural layer 110 and/or the third structural layer 130 may be a thermally stable material layer. The thermally stable material layer refers to that the material layer is not easy to deform and has a good stability within a certain temperature range. For instance, when a temperature change is less than 80 degrees centigrade, the degree of deformation of the material layer may be less than 0.065%.

In some embodiments, components of the first structural layer may include polyvinyl chloride, one or more inorganic fillers, at least one lubricating agent, at least one stabilizer, acrylonitrile butadiene styrene (ABS) resin, and at least one plasticizer. In some embodiments, components of the one or more inorganic fillers may include the heavy calcium carbonate, the hollow glass microbeads, or the like, or any combinations thereof. In some embodiments, a ratio of parts by weight of the hollow glass microbeads to parts by weight of the one or more inorganic fillers may not be greater than 35%. In some embodiments, the first structural layer may include 90 to 110 parts by weight of the polyvinyl chloride, 270 to 330 parts by weight of the one or more inorganic fillers, 0.8 to 2.6 parts by weight of the at least one lubricating agent, 3.0 to 6.0 parts by weight of the at least one stabilizer, 8 to 10 parts by weight of the ABS resin, and 5 to 15 parts by weight of the at least one plasticizer.

In some embodiments, the parts by weight of the at least one lubricating agent may be within a range of 0.9 to 2.5. In some embodiments, the parts by weight of the at least one lubricating agent may be within a range of 1.1 to 2.3. In some embodiments, the parts by weight of the at least one lubricating agent may be within a range of 1.3 to 2.1. In some embodiments, the parts by weight of the at least one lubricating agent may be within a range of 1.5 to 1.9. In some embodiments, the parts by weight of the at least one lubricating agent may be within a range of 1.6 to 1.8. In some embodiments, the parts by weight of the at least one lubricating agent may be 1.7. In some embodiments, the at least one lubricating agent may include 0.4 to 1.2 parts by weight of polyethylene wax and 0.4 to 1.4 parts by weight of stearic acid.

In some embodiments, the at least one lubricating agent may include an internal lubricating agent and an external lubricating agent. In some embodiments, the internal lubricating agent may include the stearic acid. In some embodiments, the external lubricating agent may include the polyethylene wax. In some embodiments, the lubricating agent may include a composite lubricating agent. The composite lubricating agent may have functions of the internal lubricating agent and the external lubricating agent. For example, the composite lubricating agent may include fatty acid soaps, fatty amides, or the like. In some embodiments, the lubricating agent may include an internal lubricating agent, an external lubricating agent, and a composite lubricating agent.

In some embodiments, the components of the first structural layer may further include 0.1 to 0.5 parts by weight of oxidized polyethylene wax. In some embodiments, the components of the first structural layer may further include 0.2 to 0.5 parts by weight of carbon black.

In some embodiments, components of the third structural layer may be the same as the components of the first structural layer. Alternatively, the components of the third structural layer may be different from the components of the first structural layer.

In some embodiments, as for 425.85 parts by weight of the first structural layer 110 or the third structural layer 130, the first structural layer 110 and/or the third structural layer 130 may include 90 to 110 parts by weight of the polyvinyl chloride and at least one of the following components: 270 to 330 parts by weight of the one or more inorganic fillers, 0.4 to 1.2 parts by weight of the polyethylene wax, 3.0 to 6.0 parts by weight of the at least one stabilizer, 0.4 to 1.4 parts by weight of the stearic acid, 0.1 to 0.5 parts by weight of the oxidized polyethylene wax, 8 to 10 parts by weight of the ABS resin, 5 to 15 parts by weight of the at least one plasticizer, and 0.2 to 0.5 parts by weight of the carbon black. For example, as for 425.85 parts by weight of the first structural layer 110 or the third structural layer 130, the first structural layer 110 and/or the third structural layer 130 may include 90 to 110 parts by weight of the polyvinyl chloride, 270 to 330 parts by weight of the one or more inorganic fillers, 0.4 to 1.2 parts by weight of the polyethylene wax, 3.0 to 6.0 parts by weight of the at least one stabilizer, 0.4 to 1.4 parts by weight of the stearic acid, 0.1 to 0.5 parts by weight of the oxidized polyethylene wax, 8 to 10 parts by weight of the ABS resin, 5 to 15 parts by weight of the at least one plasticizer, and 0.2 to 0.5 parts by weight of the carbon black.

In some embodiments, the parts by weight of the polyvinyl chloride may be within a range of 80 to 120. In some embodiments, the parts by weight of the polyvinyl chloride may be within a range of 85 to 115. In some embodiments, the parts by weight of the polyvinyl chloride may be within a range of 91 to 109. In some embodiments, the parts by weight of the polyvinyl chloride may be within a range of 92 to 108. In some embodiments, the parts by weight of the polyvinyl chloride may be within a range of 94 to 106. In some embodiments, the parts by weight of the polyvinyl chloride may be within a range of 96 to 104. In some embodiments, the parts by weight of the polyvinyl chloride may be within a range of 98 to 102. In some embodiments, the parts by weight of the polyvinyl chloride may be equal to 100.

In some embodiments, the parts by weight of the one or more inorganic fillers may be within a range of 265 to 335. In some embodiments, the parts by weight of the one or more inorganic fillers may be within a range of 270 to 330. In some embodiments, the parts by weight of the one or more inorganic fillers may be within a range of 275 to 325. In some embodiments, the parts by weight of the one or more inorganic fillers may be within a range of 280 to 320. In some embodiments, the parts by weight of the one or more inorganic fillers may be within a range of 285 to 315. In some embodiments, the parts by weight of the one or more inorganic fillers may be within a range of 290 to 310. In some embodiments, the parts by weight of the one or more inorganic fillers may be within a range of 295 to 305. In some embodiments, the parts by weight of the one or more inorganic fillers may be equal to 300.

In some embodiments, the parts by weight of the polyethylene wax may be within a range of 0.4 to 1.2. In some embodiments, the parts by weight of the polyethylene wax may be within a range of 0.5 to 1.1. In some embodiments, the parts by weight of the polyethylene wax may be within a range of 0.6 to 1.0. In some embodiments, the parts by weight of the polyethylene wax may be within a range of 0.7 to 0.9. In some embodiments, the parts by weight of the polyethylene wax may be equal to 0.8.

In some embodiments, the parts by weight of the at least one stabilizer may be within a range of 3.2 to 5.8. In some embodiments, the parts by weight of the at least one stabilizer may be within a range of 3.4 to 5.6. In some embodiments, the parts by weight of the at least one stabilizer may be within a range of 3.6 to 5.4. In some embodiments, the parts by weight of the at least one stabilizer may be within a range of 3.8 to 5.2. In some embodiments, the parts by weight of the at least one stabilizer may be within a range of 4.0 to 5.0. In some embodiments, the parts by weight of the at least one stabilizer may be within a range of 4.2 to 4.8. In some embodiments, the parts by weight of the at least one stabilizer may be within a range of 4.4 to 4.6. In some embodiments, the parts by weight of the at least one stabilizer may be 4.5.

In some embodiments, the parts by weight of the stearic acid may be within a range of 0.5 to 1.3. In some embodiments, the parts by weight of the stearic acid may be within a range of 0.6 to 1.2. In some embodiments, the parts by weight of the stearic acid may be within a range of 0.7 to 1.1. In some embodiments, the parts by weight of the stearic acid may be within a range of 0.8 to 1.0. In some embodiments, the parts by weight of the stearic acid may be 0.9.

In some embodiments, the parts by weight of the oxidized polyethylene wax may be within a range of 0.1 to 0.5. In some embodiments, the parts by weight of the oxidized polyethylene wax may be within a range of 0.15 to 0.45. In some embodiments, the parts by weight of the oxidized polyethylene wax may be within a range of 0.2 to 0.4. In some embodiments, the parts by weight of the oxidized polyethylene wax may be within a range of 0.25 to 0.35. In some embodiments, the parts by weight of the oxidized polyethylene wax may be 0.3.

In some embodiments, the parts by weight of the ABS resin may be within a range of within a range of 7 to 11. In some embodiments, the parts by weight of the ABS resin may be within a range of within a range of 8 to 10. In some embodiments, the parts by weight of the ABS resin may be within a range of within a range of 8.2 to 9.8. In some embodiments, the parts by weight of the ABS resin may be within a range of 8.4 to 9.6. In some embodiments, the parts by weight of the ABS resin may be within a range of 8.6 to 9.4. In some embodiments, the part by weight of the ABS resin may be within a range of 8.8 to 9.2. In some embodiments, the parts by weight of the ABS resin may be 9.

In some embodiments, the parts by weight of the at least one plasticizer may be within a range of 6 to 14. In some embodiments, the parts by weight of the at least one plasticizer may be within a range of 7 to 13. In some embodiments, the parts by weight of the at least one plasticizer may be within a range of 8 to 12. In some embodiments, the parts by weight of the at least one plasticizer may be within a range of 9 to 11. In some embodiments, the weight of the at least one plasticizer may be 10.

In some embodiments, the parts by weight of the carbon black may be within a range of 0.22 to 0.48. In some embodiments, the parts by weight of the carbon black may be within a range of 0.24 to 0.46. In some embodiments, the parts by weight of the carbon black may be within a range of 0.26 to 0.44. In some embodiments, the parts by weight of the carbon black may be within a range of 0.28 to 0.42. In some embodiments, the parts by weight of the carbon black may be within a range of 0.3 to 0.4. In some embodiments, the parts by weight of the carbon black may be within a range of 0.32 to 0.38. In some embodiments, the parts by weight of the carbon black may be within a range of 0.34 to 0.36. In some embodiments, the parts by weight of the carbon black may be 0.35.

The stabilizer refers to an agent that keeps a structure of a polymer compound stable and prevents a decomposition and aging of the polymer compound. In some embodiments, the stabilizer may include calcium stearate. In some embodiments, the stabilizer may include a dibasic lead salt. The stabilizer may also include other substances.

In some embodiments, the oxidized polyethylene wax may be a high-density oxidized wax with an acid value of 30 and a viscosity of 25000 cps at 180 degrees centigrade. The high-density oxidized wax may have a good external lubricity and a strong internal lubrication and coupling. In addition, the high-density oxidized wax may have a good compatibility with polyolefin resins. The high-density oxidized wax may be used in a high-filling formula system of polyvinyl chloride, thereby increasing a plasticizing speed faster and reducing a processing temperature.

The plasticizer refers to a substance added to a polymer that may increase a plasticity and flexibility of the polymer. For example, the plasticizer may include dibutyl phthalate (DBP), dioctyl phthalate (DOP), epoxy soybean oil, tricresyl phosphate, triphenyl phosphate, dioctyl sebacate, chlorinated paraffin, or the like, or any combinations thereof. The plasticizer may also include other substances that meet a definition of the plasticizer.

In some embodiments, the ABS resin may be an acrylonitrile-butadiene-styrene copolymer. Since the ABS resin has rigid segments and flexible rubber segments, the ABS/PVC (polyvinyl chloride) may be mixed to improve a Vicat softening point and impact resistance of the composite crystal flooring.

In some embodiments, the first structural layer 110 and/or the third structural layer 130 may include one or more inorganic fillers.

In some embodiments, the one or more inorganic fillers may include heavy calcium carbonate, hollow glass microbeads, or the like, or any combinations thereof. For example, the one or more inorganic fillers may include the calcium carbonate and the hollow glass microbeads.

In some embodiments, a ratio of the parts by weight of the hollow glass microbeads to the parts by weight of the one or more inorganic fillers may not be greater than 35%. In some embodiments, the ratio of the parts by weight of the hollow glass microbeads to the parts by weight of the one or more inorganic fillers may be in a range of 1% to 33%. In some embodiments, the ratio of the parts by weight of the hollow glass microbeads to the parts by weight of the one or more inorganic fillers may be in a range of 3% to 31%. In some embodiments, the ratio of the parts by weight of the hollow glass microbeads to the parts by weight of the one or more inorganic fillers may be in a range of 5% to 29%. In some embodiments, the ratio of the parts by weight of the hollow glass microbeads to the parts by weight of the one or more inorganic fillers may be in a range of 7% to 27%. In some embodiments, the ratio of the parts by weight of the hollow glass microbeads to the parts by weight of the one or more inorganic fillers may be in a range of 9% to 25%. In some embodiments, the ratio of the parts by weight of the hollow glass microbeads to the parts by weight of the one or more inorganic fillers may be in a range of 11% to 23%. In some embodiments, the ratio of the parts by weight of the hollow glass microbeads to the parts by weight of the one or more inorganic fillers may be in a range of 13% to 21%. In some embodiments, the ratio of the parts by weight of the hollow glass microbeads to the parts by weight of the one or more inorganic fillers may be in a range of 15% to 19%. In some embodiments, the ratio of the parts by weight of the hollow glass microbeads to the parts by weight of the one or more inorganic fillers may be in a range of 16% to 18%.

In some embodiments, the heavy calcium carbonate may have a skeletal effect, which may improve a hardness and a heat resistance of the composite crystal flooring. In addition, the heavy calcium carbonate may be cheap, thereby saving costs.

In some embodiments, the hollow glass microbeads may have a spherical structure. Compared with other irregular-shaped fillers, the hollow glass microbeads with the spherical structure may have a better fluidity. In some embodiments, a density of the hollow glass microbeads may be within a range of 0.40 to 0.75 $g/cm^3$. In some embodiments, the density of the hollow glass microbeads may be within a range of 0.42 to 0.73 $g/cm^3$. In some embodiments, the density of the hollow glass microbeads may be within a range of 0.44 to 0.71 $g/cm^3$. In some embodiments, the density of the hollow glass microbeads may be within a range of 0.46 to 0.69 $g/cm^3$. In some embodiments, the density of the hollow glass microbeads may be within a range of 0.48 to 0.67 $g/cm^3$. In some embodiments, the density of the hollow glass microbeads may be within a range of 0.50 to 0.65 $g/cm^3$. In some embodiments, the density of the hollow glass microbeads may be within a range of 0.52 to 0.63 $g/cm^3$. In some embodiments, the density of the hollow glass microbeads may be within a range of 0.54 to 0.61 $g/cm^3$. In some embodiments, the density of the hollow glass microbeads may be within a range of 0.56 to 0.59 $g/cm^3$. In some embodiments, the density of the hollow glass microbeads may be within a range of 0.57 to 0.58 $g/cm^3$. The hollow glass microbeads may reduce the density of the composite crystal flooring. At the same time, the hollow glass microbeads may effectively improve a rigidity, a creep resistance, and a thermal stability of the composite crystal flooring. Therefore, the composite crystal flooring may not be easily deformed during use.

Figure 2:
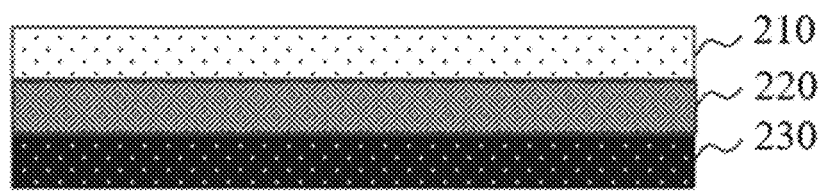
FIG. 2 is a cross-sectional view illustrating a structure of a decorative layer of a composite crystal flooring according to some embodiments of the present disclosure.

FIG. 2 is a cross-sectional view illustrating a structure of a decorative layer of a composite crystal flooring according to some embodiments of the present disclosure.

In some embodiments, a decorative layer 200 may be disposed on the coextruded and foamed substrate layer 100. In some embodiments, the decorative layer 200 may include an ultraviolet (UV) coating layer 210, a wear-resistant layer 220, a color film layer 230, or the like, or any combination thereof.

In some embodiments, the UV coating layer 210 may include a primer layer, a top paint layer, a surface curing film, or the like, or any combination thereof. The primer layer refers to a first base coating layer directly applied to a surface of an object. The top paint layer refers to a coating layer that is applied on the primer layer of the object and is close to the surface of the object. The surface curing film refers to a film for molding and curing the top paint layer. For example, the surface curing film may include a polyethylene terephthalate (PET) polyester film, a polymer polyester skin-like film, or the like.

In some embodiments, the wear-resistant layer 220 may include a wear-resistant material. In some embodiments, the wear-resistant material may include aluminum oxide, zirconium oxide, silicon carbide, wear-resistant steel, wear-resistant cast iron, or the like. For example, the wear-resistant layer 220 may be made of surface paper of aluminum oxide impregnated with melamine resin. The wear-resistant layer 220 may have properties of wear resistance, scratch resistance, burn resistance, pollution resistance, corrosion resistance, moisture resistance, etc.

The color film layer 230 may be a portion with a decorative function. For example, the color film layer 230 may be a structural layer with patterns, figures, and colors.

In some embodiments, the UV coating layer 210 may be disposed on the wear-resistant layer 220. In some embodiments, the wear-resistant layer 220 may be disposed on the color film layer 230. In some embodiments, the UV coating layer 210, the wear-resistant layer 220, and the color film layer 230 may be disposed as an integral structure. In some embodiments, the color film layer 230 may be disposed on an upper layer of the first structural layer 110 through a binder. The binder refers to a substance that binds objects to each other. For example, the binder may include PLA resin, phenol resin, or the like.

In some embodiments, the decorative layer 200 may further include a wood veneer, a bamboo veneer, melamine papers, or the like, or any combinations thereof.

In some embodiments, the UV coating layer 210 may be disposed on an upper layer of the wear-resistant layer 220 by thermal compounding. The wear-resistant layer 220 may also be disposed on an upper layer of the color film layer 230 by thermal compounding. In some embodiments, the UV coating layer 210, the wear-resistant layer 220, and the color film layer 230 may also be formed by a thermal compounding in a top-to-bottom order. The thermal compounding refers to a process of compounding objects with each other through a certain temperature.

In some embodiments, a density of the composite crystal flooring may be within a range of 1.285 to 1.45 g/cm³. In some embodiments, the density of the composite crystal flooring may be within a range of 1.29 to 1.40 g/cm³. In some embodiments, the density of the composite crystal flooring may be within a range of 1.30 to 1.39 g/cm³. In some embodiments, the density of the composite crystal flooring may be within a range of 1.31 to 1.38 g/cm³. In some embodiments, the density of the composite crystal flooring may be within a range of 1.32 to 1.37 g/cm³. In some embodiments, the density of the composite crystal flooring may be within a range of 1.33 to 1.36 g/cm³. In some embodiments, the density of the composite crystal flooring may be within a range of 1.34 to 1.35 g/cm³.

In some embodiments, a thermal dimensional change rate of the composite crystal flooring may be within a range of 0.065% to 0.15%. In some embodiments, the thermal dimensional change rate of the composite crystal flooring may be within a range of 0.07% to 0.12%. In some embodiments, the thermal dimensional change rate of the composite crystal flooring may be within a range of 0.075% to 0.115%. In some embodiments, the thermal dimensional change rate of the composite crystal flooring may be within a range of 0.08% to 0.11%. In some embodiments, the thermal dimensional change rate of the composite crystal flooring may be within a range of 0.085% to 0.105%. In some embodiments, the thermal dimensional change rate of the composite crystal flooring may be within a range of 0.09% to 0.10%. In some embodiments, the thermal dimensional change rate of the composite crystal flooring may be within a range of 0.092% to 0.098%.

In some embodiments, a static bending strength of the composite crystal flooring may be within a range of 25 to 38 MPa. In some embodiments, the static bending strength of the composite crystal flooring may be within a range of 26 to 37 MPa. In some embodiments, the static bending strength of the composite crystal flooring may be within a range of 27 to 36 MPa. In some embodiments, the static bending strength of the composite crystal flooring may be within a range of 28 to 35 MPa. In some embodiments, the static bending strength of the composite crystal flooring may be within a range of 29 to 34 MPa. In some embodiments, the static bending strength of the composite crystal flooring may be within a range of 30 to 33 MPa. In some embodiments, the static bending strength of the composite crystal flooring may be within a range of 31 to 32 MPa.

In some embodiments, a warpage of the composite crystal flooring at room temperature may be within a range of 0.1 to 0.5 mm. In some embodiments, the warpage of the composite crystal flooring at room temperature may be within a range of 0.12 to 0.4 mm. In some embodiments, the warpage of the composite crystal flooring at room temperature may be within a range of 0.14 to 0.3 mm. In some embodiments, the warpage of the composite crystal flooring at room temperature may be within a range of 0.16 to 0.28 mm. In some embodiments, the warpage of the composite crystal flooring at room temperature may be within a range of 0.18 to 0.26 mm. In some embodiments, the warpage of the composite crystal flooring at room temperature may be within a range of 0.2 to 0.24 mm. In some embodiments, the warpage of the composite crystal flooring at room temperature may be within a range of 0.21 to 0.23 mm.

In some embodiments, an elongation displacement of the composite crystal flooring at break may be within a range of 4.5 to 12 mm. In some embodiments, the elongation displacement of the composite crystal flooring at break may be within a range of 5 to 11 mm. In some embodiments, the elongation displacement of the composite crystal flooring at break may be within a range of 6 to 10 mm. In some embodiments, the elongation displacement of the composite crystal flooring at break may be within a range of 7 to 9 mm. In some embodiments, the elongation displacement of the composite crystal flooring at break may be within a range of 7.5 to 8.5 mm.

In some embodiments, a heat deflection Vicat temperature of the composite crystal flooring may be within a range of 55 to 70 degrees centigrade. In some embodiments, the heat deflection Vicat temperature of the composite crystal flooring may be within a range of 57 to 68 degrees centigrade. In some embodiments, the heat deflection Vicat temperature of the composite crystal flooring may be within a range of 59 to 66 degrees centigrade. In some embodiments, the heat deflection Vicat temperature of the composite crystal flooring may be within a range of 61 to 64 degrees centigrade. In some embodiments, the heat deflection Vicat temperature of the composite crystal flooring may be within a range of 62 to 63 degrees centigrade.

Figure 3:
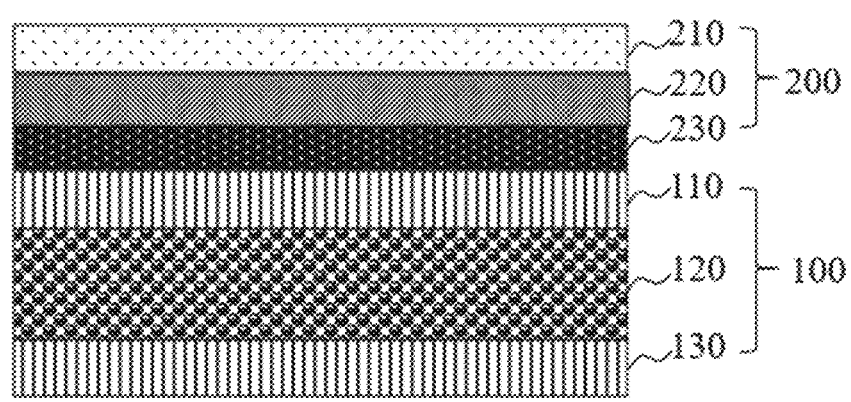
FIG. 3 is a diagram illustrating an exemplary structure of a composite crystal flooring according to some embodiments of the present disclosure.

FIG. 3 is a diagram illustrating an exemplary structure of a composite crystal flooring according to some embodiments of the present disclosure. The composite crystal flooring may include a coextruded and foamed substrate layer 100 and a decorative layer 200.

The coextruded and foamed substrate layer 100 may include at least a first structural layer 110, a second structural layer 120, and a third structural layer 130. The first structural layer 110, a second structural layer 120, and a third structural layer 130 may be sequentially formed in a stacking order from top to bottom. More descriptions regarding a specific composition and a connection mode of the coextruded and foamed substrate layer 100 and the decorative layer 200 may be found in FIGS. 1-2 and the descriptions thereof.

In some embodiments, other structural layers may be disposed between the first structural layer 110, the second structural layer 120, and the third structural layer 130.

In some embodiments, the composite crystal flooring may further include a back cushion layer (not shown in the figure). The back cushion layer may include a cork pad, an irradiation crosslinked polyethylene foam (IXPE) silent pad, an ethylene-vinyl acetate (EVA) silent pad, a rubber silent pad, or the like, or any combinations thereof. The back cushion layer may be disposed under the coextruded and foamed substrate layer 100 or any other suitable positions.

Figure 4:
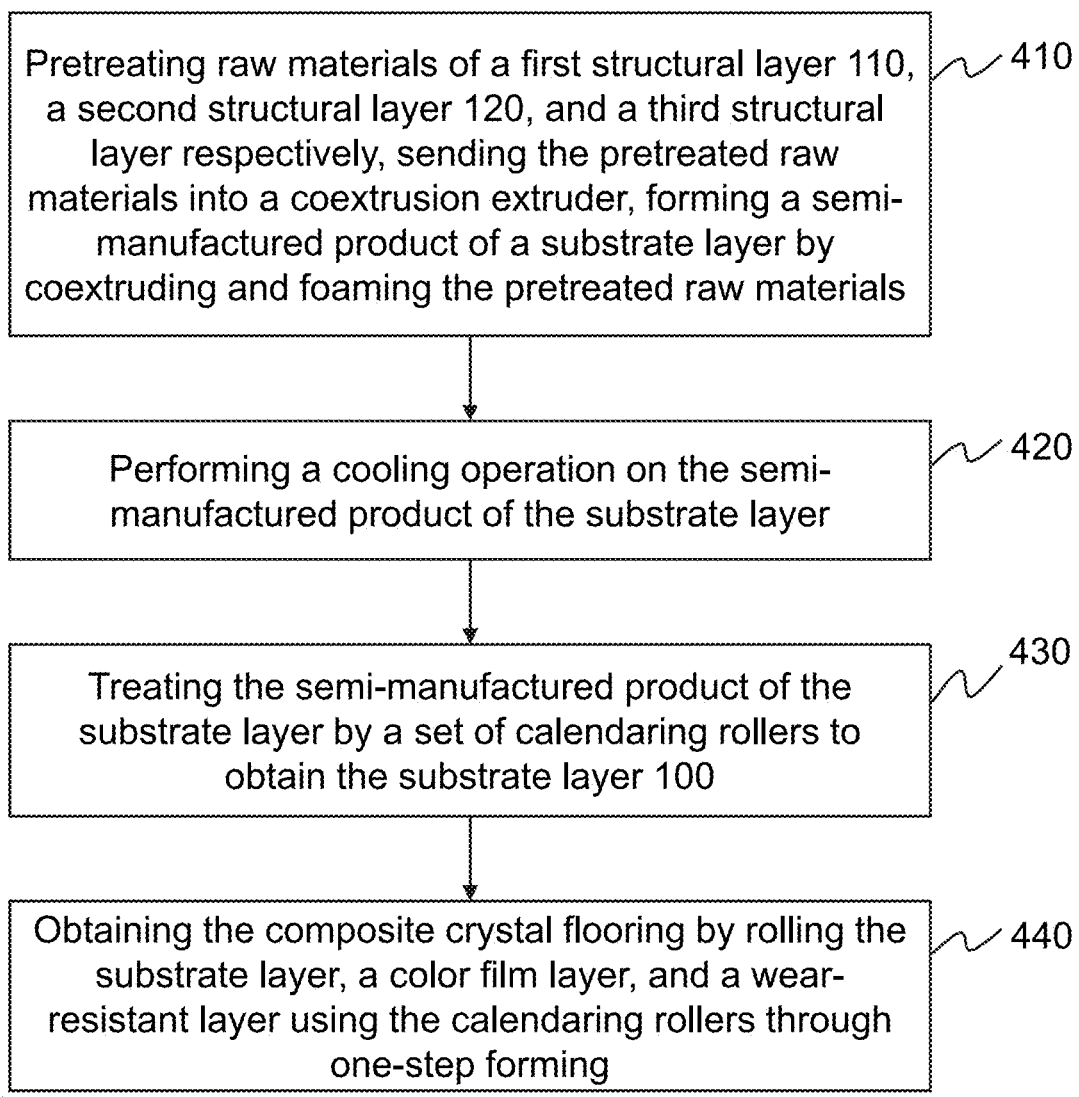
FIG. 4 is a schematic flowchart illustrating an exemplary process for manufacturing a composite crystal flooring according to some embodiments of the present disclosure.

FIG. 4 is a schematic flowchart illustrating an exemplary process for manufacturing a composite crystal flooring according to some embodiments of the present disclosure. The composite crystal flooring may include a coextruded and foamed substrate layer 100. The coextruded and foamed substrate layer 100 may include a first structural layer 110, a second structural layer 120, and a third structural layer 130. In some embodiments, the composite crystal flooring may further include a decorative layer 200, such as a UV coating layer 210, a color film layer 230, and a wear-resistant layer 220.

As shown in FIG. 4, the manufacturing process of the composite crystal flooring may include the following operations.

In 410, raw materials of the first structural layer 110, the second structural layer 120, and the third structural layer 130 may be pretreated, respectively. The pretreated raw materials of the first structural layer 110, the second structural layer 120, and the third structural layer 130 may be sent into a coextrusion extruder. A semi-manufactured product of a substrate layer may be formed by coextruding and foaming the pretreated raw materials. In some embodiments, the substrate layer refers to as the "coextruded and foamed substrate layer."

In some embodiments, the raw material of the first structural layer 110 may include 90 to 110 parts by weight of polyvinyl chloride, 270 to 330 parts by weight of one or more inorganic fillers, 0.4 to 1.2 parts by weight of polyethylene wax, 3.0 to 6.0 parts by weight of at least one stabilizer, 0.4 to 1.4 parts by weight of stearic acid, 0.1 to 0.5 parts by weight of oxidized polyethylene wax, 8 to 10 parts by weight of acrylonitrile butadiene styrene (ABS) resin, 5 to 15 parts by weight of at least one plasticizer, and 0.2-0.5 parts by weight of carbon black. In some embodiments, the raw materials of the second structural layer 120 may include 90 to 110 parts by weight of polyvinyl chloride, 100 to 200 parts by weight of one or more inorganic fillers, 0.8 to 1.0 parts by weight of polyethylene wax, 6.0 to 8.0 parts by weight of at least one stabilizer, 0.9 to 1.1 parts by weight of stearic acid, 1.6 to 2.1 parts by weight of at least one foaming agent, and 12 to 15 parts by weight of at least one foaming regulator. In some embodiments, the raw materials of the third structural layer 130 may include 90 to 110 parts by weight of polyvinyl chloride, 270 to 330 parts by weight of one or more inorganic fillers, 0.4 to 1.2 parts by weight of polyethylene wax, 3.0 to 6.0 parts by weight of at least one stabilizer, 0.4 to 1.4 parts by weight of stearic acid, 0.1 to 0.5 parts by weight of oxidized polyethylene wax, 8 to 10 parts by weight of acrylonitrile butadiene styrene (ABS) resin, 5 to 15 parts by weight of at least one plasticizer, and 0.2 to 0.5 parts by weight of carbon black. More descriptions regarding the one or more inorganic fillers and the at least one stabilizer in the raw material of the first structural layer 110, the one or more inorganic fillers and the at least one foaming agent in the raw material of the second structural layer 120, and the one or more inorganic fillers and the at least one stabilizer in the raw material of the third structural layer 130 may be found in elsewhere in the present disclosure, which may not be repeated herein.

In some embodiments, the pretreatment may include mixing and stirring the raw materials of the first structural layer 110, and raising a temperature of the raw materials of the first structural layer 110 to a first preset temperature to obtain a first ingredient one. The pretreatment may also include mixing and stirring the raw materials of the third structural layer 130, and raising a temperature of the raw materials of the third structural layer 130 to the first preset temperature to obtain a second ingredient one. The pretreatment may further include mixing and stirring the raw materials of the second structural layer 120, and raising a temperature of the raw materials of the second structural layer 120 to the second preset temperature to obtain an ingredient two. In some embodiments, the first ingredient one and the second ingredient one may be collectively referred to as ingredient one.

The first preset temperature may be used to pretreat the raw materials of the first structural layer 110 and/or the third structural layer 130. The first preset temperature may include a first stirring and heating stage and a first cooling stage.

In some embodiments, a maximum temperature of the first stirring and heating stage may be set to be within a range of 80 to 105 degrees centigrade. In some embodiments, the maximum temperature of the first stirring and heating stage may be set to be within a range of 90 to 115 degrees centigrade. In some embodiments, the maximum temperature of the first stirring and heating stage may be set to be within a range of 95 to 110 degrees centigrade. In some embodiments, the maximum temperature of the first stirring and heating stage may be set to be within a range of 100 to 105 degrees centigrade.

In some embodiments, a minimum temperature of the first cooling stage may be set to exceed 55 degrees centigrade. In some embodiments, the minimum temperature of the first cooling stage may be set to exceed 56 degrees centigrade. In some embodiments, the minimum temperature of the first cooling stage may be set to exceed 57 degrees centigrade. In some embodiments, the minimum temperature of the first cooling stage may be set to exceed 58 degrees centigrade. In some embodiments, the minimum temperature of the first cooling stage may be set to exceed 59 degrees centigrade. In some embodiments, the minimum temperature of the first cooling stage may be set to exceed 60 degrees centigrade.

In some embodiments, in order to prevent the components of the first structural layer 110 from being plasticized in advance, after the plasticizer is added, the temperature in the first stirring and heating stage may not exceed 115 degrees centigrade. In some embodiments, the temperature of the first stirring and heating stage may not exceed 110 degrees centigrade. In some embodiments, the temperature of the first stirring and heating stage may not exceed 105 degrees centigrade. In some embodiments, the temperature of the first stirring and heating stage may not exceed 100 degrees centigrade.

In some embodiments, the raw materials of the first structural layer 110 and the third structural layer 130 may be weighed respectively based on a ratio of parts by weight of the components, and stirred at a high speed. After the raw materials are heated to 90 to 115 degrees centigrade under the high-speed stirring, the raw materials may be stirred at a low speed and cooled down to 55 degrees centigrade to obtain the ingredient one.

In some embodiments, a time period of the high-speed stirring and heating of the raw materials may not exceed 30 minutes. In some embodiments, the time period of the high-speed stirring and heating of the raw materials may not exceed 28 minutes. In some embodiments, the time period of the high-speed stirring and heating of the raw materials may not exceed 25 minutes. In some embodiments, the time period of the high-speed stirring and heating of the raw materials may not exceed 23 minutes. In some embodiments, the time period of the high-speed stirring and heating of the raw materials may not exceed 20 minutes. In some embodiments, the time period of the high-speed stirring and heating of the raw materials may not exceed 18 minutes. In some embodiments, the time period of the high-speed stirring and heating of the raw materials may not exceed 15 minutes.

In some embodiments, a time period of the low-speed stirring and cooling of the raw materials may not exceed 30 minutes. In some embodiments, the time period of the low-speed stirring and cooling of the raw materials may not exceed 28 minutes. In some embodiments, the time period of the low-speed stirring and cooling of the raw materials may not exceed 25 minutes. In some embodiments, the time period of the low-speed stirring and cooling of the raw materials may not exceed 23 minutes. In some embodiments, the time period of the low-speed stirring and cooling of the raw materials may not exceed 20 minutes. In some embodiments, the time period of the low-speed stirring and cooling of the raw materials may not exceed 18 minutes. In some embodiments, the time period of the low-speed stirring and cooling of the raw materials may not exceed 15 minutes.

The second preset temperature may be used to pretreat the raw material of the second structural layer 120. The second preset temperature may include a second stirring and heating stage and a second cooling stage.

In order to prevent a premature decomposition of the foaming agent and avoid loss of the foaming agent, it may be necessary to control a maximum temperature of the second stirring and heating stage. In some embodiments, the maximum temperature of the second stirring and heating stage may not exceed 110 degrees centigrade. In some embodiments, the maximum temperature of the second stirring and heating stage may not exceed 105 degrees centigrade. In some embodiments, the maximum temperature of the second stirring and heating stage may not exceed 100 degrees centigrade. In some embodiments, the maximum temperature of the second stirring and heating stage may not exceed 95 degrees centigrade. In some embodiments, the maximum temperature of the second stirring and heating stage may not exceed 90 degrees centigrade.

In some embodiments, a minimum temperature of the second cooling stage may exceed 55 degrees centigrade. In some embodiments, the minimum temperature of the second cooling stage may exceed 56 degrees centigrade. In some embodiments, the minimum temperature of the second cooling stage may exceed 57 degrees centigrade. In some embodiments, the minimum temperature of the second cooling stage may exceed 58 degrees centigrade. In some embodiments, the minimum temperature of the second cooling stage may exceed 59 degrees centigrade. In some embodiments, the minimum temperature of the second cooling stage may exceed 60 degrees centigrade.

In some embodiments, the raw materials of the second structural layer 120 may be weighed based on a ratio of parts by weight of the components, and then stirred. After the raw materials are heated to 110 degrees centigrade under the high-speed stirring, the raw materials may be stirred at a low speed and cooled to 55 degrees centigrade to obtain the ingredients two. In some embodiments, the weighing may be performed by an automatic metering system or a weighing instrument.

From the above operations, the ingredient one may be pretreated from the raw materials of the first structural layer 110 and/or the third structural layer 130. The ingredient two may be pretreated from the raw material of the second structural layer 120.

More descriptions regarding definitions of the first structural layer 110, the raw material of the first structural layer 110, the second structural layer 120, the raw material of the second structural layer 120, the third structural layer 130 and the third structural layer 130 may be found in FIGS. 1-2 and the descriptions thereof.

In some embodiments, an extrusion process of the ingredients may include sending the ingredient one into a first extruder through a feeder for plasticization. The plasticized ingredient one may be extruded from the first extruder. The extruded ingredient one may be sent into a distributor to extrude the first structural layer 110 and the third structural layer 130. The extrusion process of the ingredients may also include sending the ingredient two into a second extruder through the feeder for plasticization. The plasticized ingredient two may be extruded from the second extruder. The extruded ingredient two may be sent into the distributor to extrude the second structural layer 120.

The extruder may include a coextrusion extruder. The coextrusion extruder refers to a device that forms a mold body with a cross-section similar to a shape of an extrusion mold by sending raw materials in a viscous state after heating through the extrusion mold. The viscous state refers to a mechanical state of an amorphous polymer under high temperature and large external force for a long time. In some embodiments, the coextrusion extruder may include a main extruder, a coextruder, a feeding device (e.g., a feeder), a programmable logic controller (PLC) control system, a distributor, and a mold. In some embodiments, the blanking device may be provided on the extruder. The main extruder and the distributor may be connected by a confluence core channel. The coextruder and the distributor may also be connected through the confluence core channel. The distributor may be connected to the mold. In some embodiments, the mold may have a channel with a certain cross-sectional shape. In some embodiments, the PLC control system may be used to control operations of the plurality of components of the coextrusion extruder (e.g., the main extruder, the coextruder, the feeding device, the distributor, and/or the mold).

In some embodiments, the raw materials of the first structural layer 110 and the third structural layer 130 may be pretreated and put into one of the main extruder and the coextruder. The raw materials of the first structural layer 110 and the third structural layer 130 may be plasticized and extruded to the distributor. The distributor may extrude the first structural layer 110 and the third structural layer 130 to the mold. Subsequently, the raw materials of the second structural layer 120 may be pretreated and put into one of the main extruder and the coextruder. The raw materials of the second structural layer 120 may be plasticized and extruded to the distributor. The distributor may extrude the f second structural layer 120 to the same mold. Finally, the materials may be foamed and formed in the mold to obtain a semi-manufactured product of the coextruded and foamed substrate layer.

The semi-manufactured product of the coextruded and foamed substrate layer refers to an intermediate product that has been partially processed but has not yet been made into the final coextruded and foamed substrate layer.

In 420, the semi-manufactured product of the substrate layer may be cooled.

After foaming molding, the semi-manufactured product of the coextruded and foamed substrate layer may have a relatively high temperature. In order to prevent a secondary foaming at an excessive temperature from causing cell rupture, it may be necessary to cool the semi-manufactured product of the coextruded and foamed substrate layer. In some embodiments, the process 400 may also include a cooling and pre-sizing treatment and a cooling and sizing treatment. In some embodiments, a sizing sleeve may be used to perform the cooling and pre-sizing treatment on the semi-manufactured product of the coextruded and foamed substrate layer to prepare for the subsequent cooling and sizing treatment. Therefore, the overall cooling and sizing treatment may be more efficient. The coextruded and foamed substrate layer and the composite crystal flooring with a better performance (e.g., better thermal stability, etc.) may be further obtained. More descriptions regarding the cooling and sizing treatment may be found later, which may not be repeated herein.

In some embodiments, a foaming thickness may be controlled by a lip gap of the mold. A heat-conducting oil sizing sleeve within a range of 5 to 15 millimeters may be disposed before the lip of the mold. The heat-conducting oil sizing sleeve may be used to perform the cooling and sizing treatment on the semi-manufactured product of the coextruded and foamed substrate layer. In some embodiments, a temperature of the sizing sleeve may be set to 90 to 180 degrees centigrade. In some embodiments, the temperature of the sizing sleeve may be set to 100 to 170 degrees centigrade. In some embodiments, the temperature of the sizing sleeve may be set to 110 to 160 degrees centigrade. In some embodiments, the temperature of the sizing sleeve may be set to 120 to 150 degrees centigrade. In some embodiments, the temperature of the sizing sleeve may be set to 130 to 140 degrees centigrade.

In 430, the semi-manufactured product of the substrate layer may be treated by a set of calendaring rollers to obtain the substrate layer 100.

The roller may include a cylindrically rotatable component. The set of rollers may include one or more rollers.

In some embodiments, the rollers and the set of rollers may be used to perform one or more operations, such as calendaring, printing, and cooling. According to a function of the set of rollers, the set of rollers may be referred to as a set of calendaring rollers, a set of cooling rollers, or a set of printing rollers.

The set of cooling rollers may be one or more sets of roller components used for cooling and sizing. After leaving the set of calendaring rollers, the calendared product may begin to gradually cool down. Since the temperature of the semi-manufactured product of the coextruded and foamed substrate layer is still relatively high after foaming, in order to prevent the secondary foaming at an excessive temperature from causing cell rupture, it may be necessary to cool down the semi-manufactured product of the coextruded and foamed substrate layer through the set of cooling rollers.

The roller body of the cooling roller may include a cavity. In some embodiments, cooling water may pass through the cavity. Therefore, the product passing through the cooling roller may be cooled down.

In some embodiments, the set of cooling rollers may be used to perform the cooling and sizing treatment on the semi-manufactured product of the coextruded and foamed substrate layer. In some embodiments, a temperature of the cooling water in the set of cooling rollers may be set to be within a range of 15 to 30 degrees centigrade. In some embodiments, the temperature of the cooling water in the set of cooling rollers may be set to be within a range of 17 to 28 degrees centigrade. In some embodiments, the temperature of the cooling water in the set of cooling rollers may be set to be within a range of 19 to 26 degrees centigrade. In some embodiments, the temperature of the cooling water in the set of cooling rollers may be set to be within a range of 21 to 24 degrees centigrade.

In some embodiments, the set of cooling rollers may be fixed before the set of calendaring rollers. In some embodiments, the set of cooling rollers and the set of calendaring rollers may be controlled by a same control system. Alternatively, the set of cooling rollers and the set of calendaring rollers may be controlled by different control systems. For example, a speed adjustment of the set of cooling rollers may be controlled by a same PLC control system as that of the set of calendaring rollers to achieve a speed synchronization. As another example, a speed of a certain set of rollers may be adjusted individually. In some embodiments, spacing between the cooling rollers may be controlled and adjusted by a pneumatic hydraulic device or a servo motor screw lifting device.

In some embodiments, the set of calendaring rollers may be used to perform a calendaring treatment on the semi-manufactured product of the coextruded and foamed substrate layer to obtain the coextruded and foamed substrate layer.

The set of calendaring rollers may be one or more sets of roller components that perform a function of calendaring.

Figure 5:
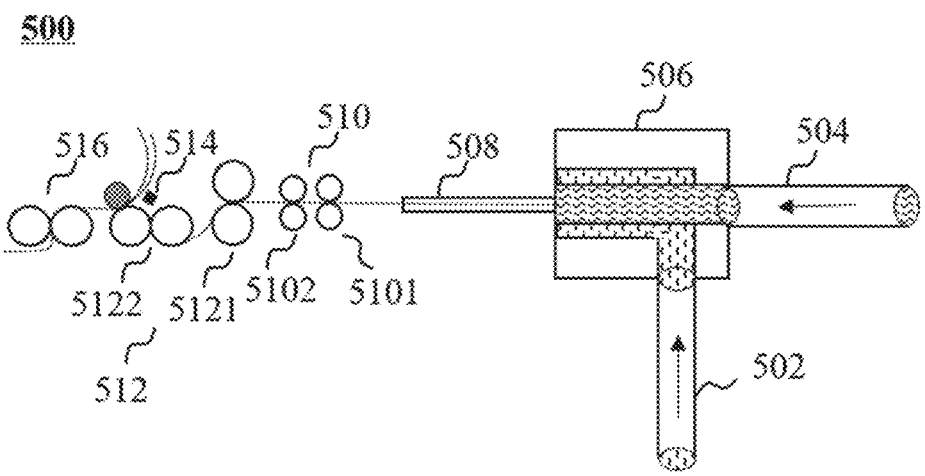
FIG. 5 is a diagram illustrating an exemplary structure of a device for manufacturing a composite crystal flooring according to some embodiments of the present disclosure.

In some embodiments, the set of calendaring rollers may include at least one set of calendaring rollers. As shown in FIG. 5, the set of calendaring rollers may include a first set of calendaring rollers and a second set of calendaring rollers.

The calendaring refers to using the rollers to apply pressure onto the material to cause the material to stretch. For example, plasticized thermoplastic under a temperature close to the temperature of the viscous state may transferred through a series of gaps of horizontal rollers oppositely rotating. Therefore, the plasticized thermoplastic may be subjected to squeezing and stretching to become a sheet-like semi-manufactured board or manufactured board with a certain thickness, width, and surface smoothness. The viscous state refers to a mechanical state of an amorphous polymer under high temperature and large external force for a long time.

The set of calendaring rollers may include one or more sets of roller components that perform a function of printing by rollers.

In some embodiments, a same set of rollers may have a function of the set of calendaring rollers, a function of the set of cooling rollers, a function of the set of printing rollers, or the like, or any combinations thereof.

In some embodiments, positions between the sets of rollers and working temperatures of the sets of rollers may be determined according to actual requirements in a production process.

In 440, the composite crystal flooring may be obtained by rolling the substrate layer, the color film layer, and the wear-resistant layer using the calendaring rollers through one-step forming.

In some embodiments, an infrared heating cover may be used to heat the coextruded and foamed substrate layer using infrared to a third preset temperature, so that the coextruded and foamed substrate layer, the color film layer, and the wear-resistant layer may be rolled to form the composite crystal flooring. In some embodiments, the third preset temperature may be determined to help the coextruded and foamed substrate layer 100 and the decorative layer 200 (e.g., the color film layer 230 and the wear-resistant layer 220) to form the composite crystal flooring.

The third preset temperature may be within a preset temperature range for thermally compounding different structural layers to achieve a bonding effect. The temperature range may need to be determined according to types of structural layers. In some embodiments, the third preset temperature may be within a range of 145 to 185 degrees centigrade. In some embodiments, the third preset temperature may be within a range of 155 to 175 degrees centigrade. In some embodiments, the third preset temperature may be within a range of 158 to 172 degrees centigrade. In some embodiments, the third preset temperature may be within a range of 160 to 170 degrees centigrade. In some embodiments, the third preset temperature may be within a range of 162 to 168 degrees centigrade. In some embodiments, the third preset temperature may be 165 degrees centigrade.

The infrared heating cover may be a component that raises a temperature of an object to a specific temperature by heating using infrared. For example, the infrared heating cover may include an infrared heating cover lamp.

The heating using infrared may include a radiant heating. For example, energy may be transferred through electromagnetic waves. Molecules and atoms inside the object may produce strong vibration and rotation. The vibration and rotation may increase the temperature of the object to achieve a purpose of heating.

Printing by rollers refers to a printing process in which patterns or figures engraved on the printing roller is continuously rotated by a machine to continuously transfer the printing paste to a surface of a material.

Combining operation 430 and operation 440, the semi-manufactured product of the coextruded and foamed substrate layer may enter two sets of cooling rollers to cool and size a surface of the semi-manufactured product. A temperature of water may be set to be within a range of 15 to 30 degrees centigrade. Then, the semi-manufactured product of the coextruded and foamed substrate layer may enter the first set of calendaring rollers and the second set of calendaring rollers for performing a heat preservation treatment, a thickness-setting treatment, and a molding treatment to obtain the coextruded and foamed substrate layer. A temperature of a roller in the set of calendaring rollers may be set to be within a range of 130 to 180 degrees centigrade. After exiting the set of calendaring rollers, the infrared heating cover may be disposed above the coextruded and foamed substrate layer to heat the set of calendaring rollers. The temperature of the surface of the coextruded and foamed substrate layer may be used to thermally compound with the color film layer 230 and the wear-resistant layer 220. The set of printing rollers may be used to print a plate pattern through one-step forming to obtain the composite crystal flooring.

It should be noted that the above description regarding the process 400 is merely provided for the purposes of illustration, and not intended to limit the scope of the present disclosure. For persons having ordinary skills in the art, multiple variations and modifications on the process 400 may be made under the teachings of the present disclosure. However, those variations and modifications do not depart from the scope of the present disclosure. For example, the process 400 may also include compounding the back cushion layer under the coextruded and foamed substrate layer 100.

FIG. 5 is a diagram illustrating an exemplary structure of a device for manufacturing a composite crystal flooring according to some embodiments of the present disclosure.

The device 500 for manufacturing the composite crystal flooring may include a first extruder 502, a second extruder 504, a distributor 506, a mold 508, a set of cooling rollers 510, a set of calendaring rollers 512, a set of printing rollers 516, or the like. In some embodiments, the set of cooling rollers 510 and/or the set of calendaring rollers 512 may be disposed in multiple sets. For example, the set of cooling rollers 510 may include a first set of cooling rollers 5101 and a second set of cooling rollers 5102. For example, the set of calendaring rollers 512 may include a first set of calendaring rollers 5121, a second set of calendaring rollers 5122, or the like.

In some embodiments, components of the device 500 may be connected sequentially as shown in FIG. 5. The connection sequence of the components of the device 500 may be adjusted according to actual requirements. The present disclosure may not limit the sequence of the components of the device 500 in any way.

The first extruder 502 may be used to plasticize and extrude ingredient one. After the plasticized ingredient one is extruded, the ingredient one may enter the distributor 506 to form a first structural layer 110 and a third structural layer 130. More descriptions regarding the ingredient one may be found in FIG. 4 and the descriptions thereof.

The second extruder 504 may be used to plasticize and extrude ingredient two. After the plasticized ingredient two may enter the distributor 506 to form a second structural layer 120. More descriptions regarding the ingredient two may be found in FIG. 4 and the descriptions thereof.

In order to ensure that raw materials of the first structural layer 110 and the third structural layer 130 reach a plasticizing temperature, and prevent the raw materials of the first structural layer 110 and the third structural layer 130 from being over-plasticized simultaneously, the temperature in the first extruder 502 may be set to gradually decrease in a feeding direction of the first extruder 502 (e.g., a direction indicated by an arrow in the first extruder 502 in FIG. 5). In some embodiments, the temperature of the first extruder 502 and the temperature of the second extruder 504 may be set according to different zones. For example, a temperature of each zone of the first extruder 502 may be set as 200 degrees centigrade in a first zone, 195 degrees centigrade in a second zone, 190 degrees centigrade in a third zone, 185 degrees centigrade in a fourth zone, 180 degrees centigrade in a fifth zone, and 170 degrees centigrade in a confluence core.

In order to avoid a premature decomposition of at least of foaming agent in the second structural layer 120, prevent materials of the second structural layer 120 from being plasticized or over-plasticized in advance simultaneously, and ensure that the material of the second structural layer 120 reach the plasticizing temperature, a temperature in the second extruder 504 may be set to vary in a certain order in a feeding direction of the second extruder 504 (e.g., a direction indicated by an arrow in the second extruder 504 in FIG. 5). For example, the temperature in the second extruder 504 may be set to a low temperature firstly. Then the temperature in the second extruder 504 may be raised to a higher temperature. Finally, the temperature in the second extruder 504 may be lowered down. In some embodiments, the temperature of the second extruder 504 may be set in according to different zones. For example, a temperature of each zone of the second extruder 504 may be set as 165 degrees centigrade in a first zone, 170 degrees centigrade in a second zone, 190 degrees centigrade in a third zone, 180 degrees centigrade in a fourth zone, 180 degrees centigrade in a fifth zone, and 170 degrees centigrade in a confluence core.

In some embodiments, the first extruder 502 and the second extruder 504 may use conical twin-screw extruders. In some embodiments, the conical twin-screw extruder may include a feeding system, a vacuum system, a main machine barrel, a connecting device, a power device, and a control system. In some embodiments, the first extruder 502 and the second extruder 504 may be connected to the distributor 506 through a connecting pipe.

In some embodiments, the distributor 506 may include three layers for the first structural layer 110, the second structural layer 120, and the third structural layer 130, respectively. In some embodiments, the distributor 506 may include a flow channel. The flow channel may be used to connect the first extruder 502 and the second extruder 504, respectively.

In some embodiments, the mold 508 may be used for foam molding. A lip gap of the mold may be adjusted to control a foaming thickness.

In some embodiments, the set of cooling rollers 510 may be used to cool and size a surface of a material entering gaps of the set of cooling rollers 510. As shown in FIG. 5, the set of cooling rollers 510 may include the first set of cooling rollers 5101 and the second set of cooling rollers 5102. In some embodiments, the spacing between the rollers of the first set of cooling rollers 5101 and/or the spacing between the rollers of the second set of cooling rollers 5102 may be controlled and adjusted by a pneumatic hydraulic device or a servo motor screw lifting device. In some embodiments, the roller bodies of the first set of cooling rollers 5101 and/or the roller bodies of the second set of cooling rollers 5102 may include cavities. In some embodiments, cooling water may pass through the cavity to cool down the material passing through the first set of cooling rollers 5101 and/or the second set of cooling rollers 5102. In some embodiments, a temperature of the cooling water in the first set of cooling rollers 5101 and/or the second set of cooling rollers 5102 may be set according to requirements. For example, the temperature of the cooling water can be set within a range of 15 to 30 degrees centigrade. More description regarding the set of cooling rollers 510 may be found in FIG. 8 and the descriptions thereof.

In some embodiments, the set of calendaring rollers 512 may be used to perform a calendaring operation on the material by the roller. In some embodiments, the set of calendaring rollers 512 may include a first set of calendaring rollers 5121 and a second set of calendaring rollers 5122. In some embodiments, a temperature of the first set of calendaring rollers 5121 and a temperature of the second set of calendaring rollers 5122 may be set to be the same or different as needed. For example, the temperature of the first set of calendaring rollers 5121 may be set to be within a range of 90 to 130 degrees centigrade. The temperature of the second set of calendaring rollers 5122 may be set to be within a range of 140 to 160 degrees centigrade.

In some embodiments, a control system of the set of calendaring rollers 512 and a control system of the set of coiling rollers 510 may be the same or different. In some embodiments, speeds of the set of calendaring rollers 512 and speeds of the set of coiling rollers 510 may be controlled to be the same or different. In some embodiments, speeds of the first set of coiling rollers 5101 and/or speeds of the second set of coiling rollers 5102 may be the same or different. In some embodiments, speeds of the first set of calendaring rollers 5121 and speeds of the second set of calendaring rollers 5122 may be the same or different.

In some embodiments, the device 500 may further include an infrared heating cover 514. The infrared heating cover 514 may be disposed above the set of calendaring rollers 512 (e.g., the second set of calendaring rollers 5122) to heat the set of calendaring rollers 512 (e.g., the second set of calendaring rollers 5122). For example, the infrared heating cover 514 may heat the coextruded and foamed substrate layer, so that the coextruded and foamed substrate layer may be thermally compounded with the color film layer and the wear-resistant layer. In some embodiments, a temperature of the infrared heating cover 514 may be greater than a temperature of the set of calendaring rollers 512 (e.g., the second set of calendaring rollers 5122). For example, the temperature of the infrared heating cover 514 may be set to 165 degrees centigrade.

In some embodiments, the set of printing rollers 516 may be used to print and press the material to mold. In some embodiments, a temperature of the printing rollers of the set of printing rollers 516 may be set according to requirements. For example, the temperature of the embossing roller group 516 may be set to be within a range of 25 to 35 degrees centigrade.

In some embodiments, the device 500 may further include a sizing sleeve. The sizing sleeve may be set at an exit of the lip of the mold 508. The sizing sleeve may be used to cool and pre-size the material by means of heat-conducting oil. In some embodiments, a temperature of the sizing sleeve may be set according to requirements. For example, the temperature of the styling sleeve may be set to be within a range of 90 to 180 degrees centigrade. As another example, the temperature of the sizing sleeve may be set to be within a range of 100 to 170 degrees centigrade. As still another example, the temperature of the sizing sleeve may be set to be within a range of 110 to 160 degrees centigrade. As still another example, the temperature of the sizing sleeve may be set to be within a range of 120 to 150 degrees centigrade. As a further example, the temperature of the sizing sleeve may be set to be within a range of 130 to 140 degrees centigrade. More descriptions regarding the sizing sleeve may be found in FIG. 6 and the descriptions thereof.

In some embodiments, the device 500 may further include the PLC control system. The PLC control system may be used to control operations of the plurality of components of the device 500 (e.g., the first extruder 502, the second extruder 504, the distributor 506, the mold 508, the set of coiling rollers 510, the set of calendaring rollers 512, the infrared heating cover 514, the set of printing rollers 516, and/or sizing sleeve). For example, the PLC control system may be used to control the speed of the set of coiling rollers 510, the set of calendaring rollers 512, and/or the set of printing rollers 516. As another example, the PLC control system may be used to control a heating power of the infrared heating cover 514. As still another example, the PLC control system may be used to control spacing of a mouth model 602 of the sizing sleeve 602, or the like.

Figure 6:
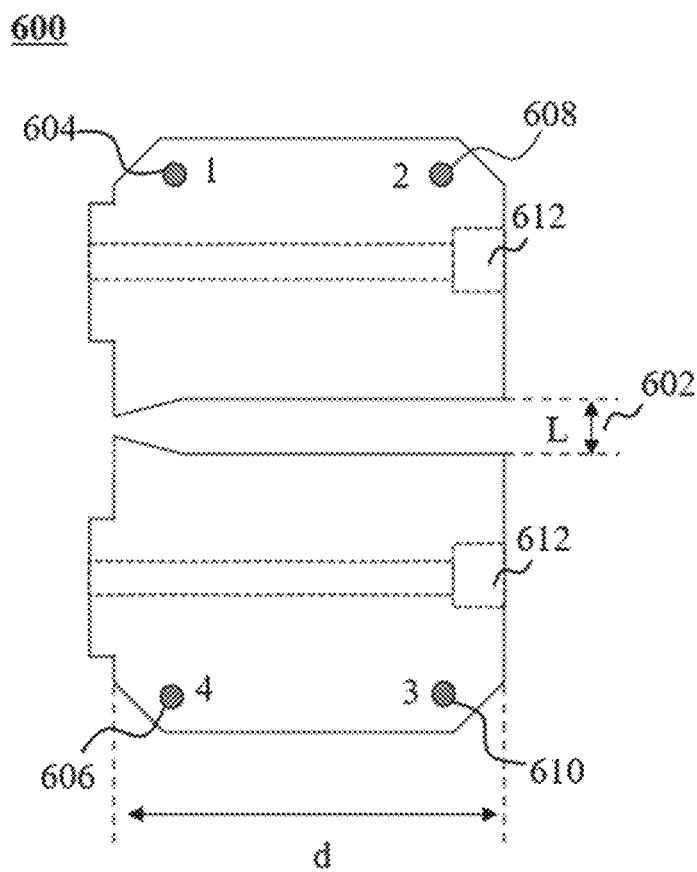
FIG. 6 is a side view illustrating an exemplary sizing sleeve according to some embodiments of the present disclosure.

FIG. 6 is a side view illustrating an exemplary sizing sleeve according to some embodiments of the present disclosure.

In some embodiments, the sizing sleeve 600 may include a mouth mold 602 of the sizing sleeve and an inlet and outlet for heat-conducting oil. In some embodiments, the spacing of the mouth mold 602 of the sizing sleeve may be adjusted according to a thickness of a mold lip of the mold 508.

In order to be able to pre-size materials, a width of the sizing sleeve 600 may be determining according to requirement. In some embodiments, the width d of the shaping sleeve 600 may be set to be within a range of 1 to 19 millimeters. In some embodiments, the width d of the shaping sleeve 600 may be set to be within a range of 2 to 18 millimeters. In some embodiments, the width d of the shaping sleeve 600 may be set to be within a range of 3 to 17 millimeters. In some embodiments, the width d of the shaping sleeve 600 may be set to be within a range of 4 to 16 millimeters. In some embodiments, the width d of the shaping sleeve 600 may be set to be within a range of 5 to 15 millimeters. In some embodiments, the width d of the shaping sleeve 600 may be set to be within a range of 6 to 14 millimeters. In some embodiments, the width d of the shaping sleeve 600 may be set to be within a range of 7 to 13 millimeters. In some embodiments, the width d of the shaping sleeve 600 may be set to be within a range of 8 to 12 millimeters. In some embodiments, the width d of the shaping sleeve 600 may be set to be within a range of 9 to 11 millimeters. In some embodiments, the width d of the sizing sleeve 600 may be set to 10 millimeters.

In some embodiments, the sizing sleeve 600 may be disposed with a plurality of inlets and outlets for hot oil. As shown in FIG. 6, there may be 4 inlets and outlets for hot oil. For example, the inlet and outlet for hot oil may include a first hot oil outlet 604, a fourth hot oil inlet 606, a second hot oil inlet 608, and a third hot oil outlet 610.

Figure 7:
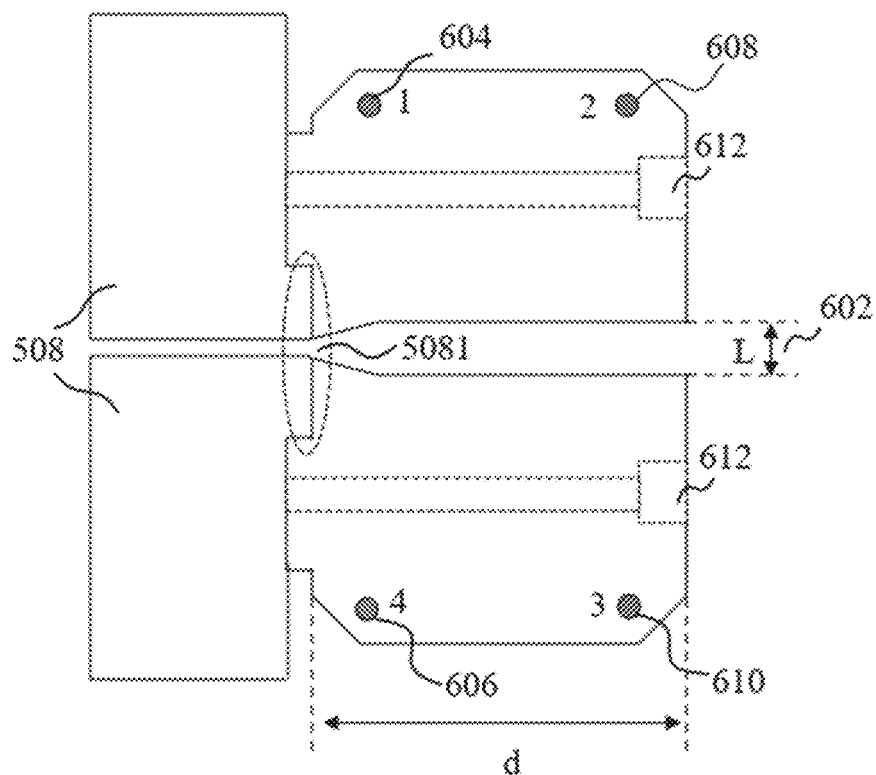
FIG. 7 is a diagram illustrating an exemplary structure of a connection between a sizing sleeve and a mold according to some embodiments of the present disclosure.

In some embodiments, a screw fixing position 612 may be disposed on the sizing sleeve 600. FIG. 7 is a diagram illustrating an exemplary structure of a connection between a sizing sleeve and a mold according to some embodiments of the present disclosure. As shown in FIG. 7, the screw fixing position 612 may be used to fix the sizing sleeve 600 on the mold 508 with screws, so that an outlet 5081 of the mold lip of the mold 508 may correspond to the mouth mold 602 of the sizing sleeve.

According to some embodiments of the present disclosure, the heat-conducting oil sizing sleeve 600 may be matched with the set of cooling rollers 510 and the set of calendaring rollers 512 to ensure that the cells do not break. While sizing a substrate surface, the coextrusion substrate surface may keep a certain temperature. Therefore, heat compounding and pressing the materials through one-step forming may be achieved, which may make the processing of composite crystal flooring easier and further reduce production costs.

Figure 8:
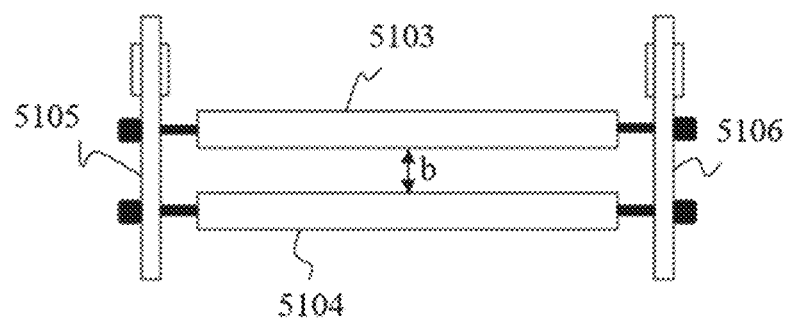
FIG. 8 is a diagram illustrating an exemplary structure of a set of cooling rollers according to some embodiments of the present disclosure.

FIG. 8 is a diagram illustrating an exemplary structure of a set of coiling rollers according to some embodiments of the present disclosure.

The set of coiling rollers 510 may include a first cooling roll 5103 and a second cooling roll 5104. In some embodiments, a distance b between the first cooling roll 5103 and the second cooling roll 5104 may be adjusted according to requirement. For example, the distance b between the first cooling roll 5103 and the second cooling roll 5104 may be determined according to a thickness of a target material. The target material refers to a material after passing through the set of coiling rollers 510.

In some embodiments, the set of coiling rollers 510 may further include a first fixing member 5105 and a second fixing member 5106. The first fixing member 5105 and the second fixing member 5106 may be used to adjust the distance b between the first cooling roll 5103 and the second cooling roll 5104. The first fixing member 5105 and the second fixing member 5106 may also be used to fix the first cooling roller 5103 and the second cooling roller 5104 to fix the adjusted distance b between the first cooling roller 5103 and the second cooling roller 5104.

In some embodiments, a structure of the set of calendaring rollers 512 and a structure of the set of printing rollers 516 may be similar to or the same as the structure of the set of coiling rollers 510.

Embodiment One

Different weight contents of the modified fly ash in the second structural layer 120 may have different effects on the performance of the composite crystal flooring. Specifically, the specific effects on the performance may be reflected through the following set of experiments.

In this set of experiments, components in the first structural layer 110 and the third structural layer 130 were set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the stabilizer (i.e., calcium stearate), 0.4 parts by weight of the stearic acid, 0.1 parts by weight of the oxidized polyethylene wax, 8 parts by weight of the ABS resin, 0.4 parts by weight of the carbon black, and 15 parts by weight of the plasticizer (i.e., dibutyl phthalate).

Components in the second structural layer 120 were set as 100 parts by weight of the polyvinyl chloride, 40 parts by weight of the composite calcium (i.e., a weight content of the heavy calcium carbonate was 70%, and a weight content of the light calcium carbonate was 30%), 10 parts by weight of the hollow glass microbeads, 1.0 parts by weight of the polyethylene wax, 8.0 parts by weight of the at least one stabilizer (i.e., calcium stearate), 1.1 parts by weight of the stearic acid, 0.9 parts by weight of the yellow foaming agent (i.e., azodicarbonamide), 1.2 parts by weight of the white foaming agent (sodium bicarbonate), 15 parts by weight of the at least one foaming regulator (i.e., ethyl acrylate), and different parts by weight of the modified fly ash.

The test results may include performances of the composite crystal flooring in terms of a density (ISO23996), a warpage at room temperature (ISO23999), a heat deflection Vicat temperature, a static bending strength (GB/T17657), a thermal dimensional change rate (ISO23999), and a hardness (GB/T2411) of the second structural layer 120. As used herein, the hardness of the second structural layer 120 refers to an ability of the second structural layer 120 to resist a hard object pressed into a surface of the second structural layer 120.

(1) When the weight content of the modified fly ash was set to 50 parts by weight, the results of the performance test were obtained as followings. The density was 1.306 g/cm$^3$. The warpage at room temperature was 0.50 millimeters. The heat deflection Vicat temperature was 60 degrees centigrade. The static bending strength was 25 MPa. The thermal dimensional change rate was 0.13%. The hardness was 75 HD.

(2) When the weight content of the modified fly ash was set to 100 parts by weight, the results of the performance test were obtained as followings. The density was 1.330 g/cm$^3$. The warpage at room temperature was 0.35 millimeters. The heat deflection Vicat temperature was 60 degrees centigrade. The static bending strength was 33 MPa. The thermal dimensional change rate was 0.08%. The hardness was 77 HD.

(3) When the weight content of the modified fly ash was set to 150 parts by weight, the results of the performance test were obtained as followings. The density was 1.380 g/cm$^3$. The warpage at room temperature was 0.20 millimeters. The heat deflection Vicat temperature was 70 degrees centigrade. The static bending strength was 35 MPa. The thermal dimensional change rate was 0.10%. The hardness was 81 HD.

(4) In this experiment, the 40 parts by weight of the composite calcium (i.e., the weight content of the heavy calcium carbonate was 70%, and the weight content of the light calcium carbonate was 30%) and 10 parts by weight of the hollow glass microbeads in the second structural layer 120 in the experiments (1)-(3) were replaced by 50 parts by weight of the modified fly ash. In this experiment, the one or more inorganic fillers of the second structural layer 120 was 200 parts by weight of the modified fly ash. The results of performance test were obtained as followings. The density was 1.480 g/cm$^3$. The warpage at room temperature was 0.65 millimeters. The heat deflection Vicat temperature was 57 degrees centigrade. The static bending strength was 27 MPa. The thermal dimensional change rate was 0.25%. The hardness was 78 HD.

The experimental data shows that when the components of the first structural layer 110 and the third structural layer 130 are the same, and the other components in the second structural layer 120 are the same, the weight contents of the modified fly ash are 100 parts by weight and 150 parts by weight, the materials have a good resistance to warpage at room temperature, a good static bending strength, and a good hardness. The performances of the materials are significantly better than those of the material including 50 parts by weight of the modified fly ash. If the second structural layer 120 only uses the modified fly ash as the one or more inorganic fillers, a thermal stability (e.g., the thermal dimensional change rate) of the composite crystal flooring decreases, and the heat deflection Vicat temperature decrease. The experimental data of the weight content of the modified fly ash of the second structural layer 120 may be used as a basis of related embodiments.

Embodiment Two

Different weight contents of the hollow glass microbeads in the second structural layer 120 may have different effects on the performance of the composite crystal flooring. Specifically, the specific effects on the performance may be reflected through the following set of experiments.

In this set of experiments, components in the first structural layer 110 and the third structural layer 130 were set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the at least one stabilizer (i.e., calcium stearate), 0.4 parts by weight of the stearic acid, 0.1 parts by weight of the oxidized polyethylene wax, 8 parts by weight of the ABS resin, 0.4 parts by weight of the carbon black, and 15 parts by weight of the at least one plasticizer (i.e., dibutyl phthalate).

Components in the second structural layer 120 were set as 100 parts by weight of the polyvinyl chloride, 150 parts by weight of the modified fly ash, 40 parts by weight of the composite calcium (i.e., the weight content of the heavy calcium carbonate was 70%, the weight content of the light calcium carbonate was 30%), 1.0 parts by weight of the polyethylene wax, 8.0 parts by weight of the at least one stabilizer (i.e., calcium stearate), 1.1 parts by weight of the stearic acid, 0.9 parts by weight of the yellow foaming agent (i.e., azodicarbonamide), 1.2 parts by weight of the white foaming agent (i.e., sodium bicarbonate), 15 parts by weight of the at least one foaming regulator (i.e., ethyl acrylate), and different parts by weight of the hollow glass microbeads.

The test results may include performances of the composite crystal flooring in terms of a density (ISO23996), a warpage at room temperature (ISO23999), a heat deflection Vicat temperature, a static bending strength (GB/T17657), and a thermal dimensional change rate (ISO23999).

(1) When the hollow glass microbeads were set to 5 parts by weight, the results of the performance test were obtained as followings. The density was 1.390 g/cm³. The warpage at room temperature was 0.23 millimeters. The heat deflection Vicat temperature was 65 degrees centigrade. The static bending strength was 31 MPa. The thermal dimensional change rate was 0.11%. The elongation displacement at break was 11.5 millimeters.

(2) When the hollow glass microbeads were set to 7.5 parts by weight, the results of the performance test were obtained as followings. The density was 1.382 g/cm³. The warpage at room temperature was 0.25 millimeters. The heat deflection Vicat temperature was 69 degrees centigrade. The static bending strength was 32 MPa. The thermal dimensional change rate was 0.10%. The elongation displacement at break was 11.2 millimeters.

(3) When the hollow glass microbeads were set to 10 parts by weight, the results of the performance test were obtained as followings. The density was 1.380 g/cm³. The warpage at room temperature was 0.20 millimeters. The heat deflection Vicat temperature was 70 degrees centigrade. The static bending strength was 35 MPa. The thermal dimensional change rate was 0.10%. The elongation displacement at break was 10 millimeters.

(4) When the hollow glass microbeads were set to 12.5 parts by weight, the results of the performance test were obtained as followings. The density was 1.381 g/cm³. The warpage at room temperature was 0.50 millimeters. The heat deflection Vicat temperature was 65 degrees centigrade. The static bending strength was 30 MPa. The thermal dimensional change rate was 0.15%. The elongation displacement at break was 8.9 millimeters.

The experimental data shows that when the components of the first structural layer 110 and the third structural layer 130 are the same and the other components of the second structural layer 120 are the same, the weight content of hollow glass microbeads is 5 to 10 parts by weight, the material has a relatively good resistance to warpage at room temperature, a relatively good static bending strength, and a good thermal stability. When the weight content of hollow glass microspheres exceeds a certain range (e.g., 10 parts by weight), a degree of plasticization of the material becomes worse, resulting in a larger thermal dimensional change rate and a lower elongation displacement at break of the composite crystal floor. These experimental data of the hollow glass microbeads of the second structural layer 120 may be used as a basis of related embodiments.

Embodiment Three

Different weight contents of the composite calcium in the second structural layer 120 may have different effects on the performance of the composite crystal flooring. Specifically, the specific effects on the performance may be reflected through the following set of experiments.

In this set of experiments, components in the first structural layer 110 and the third structural layer 130 were set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the at least one stabilizer (i.e., calcium stearate), 0.4 parts by weight of the stearic acid, 0.1 parts by weight of the oxidized polyethylene wax, 8 parts by weight of the ABS resin, 0.4 parts by weight of the carbon black, and 15 parts by weight of the at least one plasticizer (i.e., dibutyl phthalate).

Components in the second structural layer 120 were set as 100 parts by weight of the polyvinyl chloride, 150 parts by weight of the modified fly ash, 10 parts by weight of the hollow glass microbeads, 1.0 parts by weight of the polyethylene wax, 8.0 parts by parts by weight of the at least one stabilizer (i.e., calcium stearate), 1.1 parts by weight of the stearic acid, 0.9 parts by weight of the yellow foaming agent (i.e., azodicarbonamide), 1.2 parts by weight of the white foaming agent (i.e., sodium bicarbonate), 15 parts by parts by weight by weight of the at least one foaming regulator (i.e., ethyl acrylate), and different parts by weight of the composite calcium.

The test results may include performances of the composite crystal flooring in terms of a density (ISO23996), a warpage at room temperature (ISO23999), a heat deflection Vicat temperature, a static bending strength (GB/T17657), and a diameter of a foaming hole.

(1) When the composite calcium was set to 20 parts by weight (i.e., the weight content of the heavy calcium carbonate is 70%, the weight content of the light calcium carbonate is 30%), the results of the performance test were obtained as followings. The density was 1.392 g/cm³. The warpage at room temperature was 0.33 millimeters. The heat deflection Vicat temperature was 70 degrees centigrade. The static bending strength was 30 MPa. The diameter of the foaming hole was 180 micrometers.

(2) When the composite calcium was set to 30 parts by weight (i.e., the weight content of the heavy calcium carbonate is 70%, the weight content of the light calcium carbonate is 30%), the results of the performance test were obtained as followings. The density was 1.383 g/cm³. The warpage at room temperature was 0.27 millimeters. The heat deflection Vicat temperature was 70 degrees centigrade. The static bending strength was 31.8 MPa. The diameter of the foaming hole was 160 micrometers.

(3) When the composite calcium was set to 40 parts by weight (i.e., the weight content of the heavy calcium carbonate is 70%, the weight content of the light calcium carbonate is 30%), the results of the performance test were obtained as followings. The density was 1.380 g/cm³. The warpage at room temperature was 0.20 millimeters. The heat deflection Vicat temperature was 70 degrees centigrade. The static bending strength was 35 MPa. The diameter of the foaming hole was 150 micrometers.

(4) When the composite calcium was set to 50 parts by weight (i.e., the weight content of the heavy calcium carbonate is 70%, the weight content of the light calcium carbonate is 30%), the results of the performance test were obtained as followings. The density was 1.420 g/cm³. The warpage at room temperature was 1.0 millimeters. The heat deflection Vicat temperature was 60 degrees centigrade. The static bending strength was 33 MPa. The diameter of the foaming hole was 153 micrometers.

The experimental data shows that when the composition of the first structural layer 110 and the third structural layer 130 are the same, the other components of the second structural layer 120 are the same, and the weight content of the composite calcium of the second structural layer 120 is 40 parts by weight, the material has a relatively good resistance to warpage at room temperature and a relatively good static bending strength. The diameter of the foaming hole is relatively small. The performances of the material are better than those of the materials with 20 parts by weight and 30 parts by weight of the composite calcium. When the composite calcium content exceeds 40 parts by weight (e.g., when the composite calcium content reaches 50 parts by weight), a coating performance of polyvinyl chloride on the one or more inorganic fillers decreases, resulting in uneven dispersion of the one or more inorganic fillers, thereby reducing the overall performance of the composite crystal flooring. These experimental data of the weight content of composite calcium in the second structural layer 120 may be used as a basis for related embodiments.

Embodiment Four

Different ratios of the composite calcium (or different the weight content of the light calcium carbonate and heavy calcium carbonate in the composite calcium) in the second structural layer 120 may have different effects on the performance of the composite crystal flooring. Specifically, the specific effects on the performance may be reflected through the following set of experiments.

In this set of experiments, components in the first structural layer 110 and the third structural layer 130 were set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the at least one stabilizer (i.e., calcium stearate), 0.4 parts by weight of the stearic acid, 0.1 parts by weight of the oxidized polyethylene wax, 8 parts by weight of the ABS resin, 0.4 parts by weight of the carbon black, and 15 parts by weight of the at least one plasticizer (i.e., dibutyl phthalate).

Components in the second structural layer 120 were set as 100 parts by weight of the polyvinyl chloride, 150 parts by weight of the modified fly ash, 10 parts by weight of the hollow glass microbeads, 1.0 parts by weight of the polyethylene wax, 8.0 parts by parts by weight of the at least one stabilizer (i.e., calcium stearate), 1.1 parts by weight of the stearic acid, 0.9 parts by weight of the yellow foaming agent (i.e., azodicarbonamide), 1.2 parts by weight of the white foaming agent (i.e., sodium bicarbonate), 15 parts by parts by weight by weight of the at least one foaming regulator (i.e., ethyl acrylate), and 40 parts by weight of the composite calcium. As used herein, the weight contents of heavy calcium carbonate and light calcium carbonate in the composite calcium were different.

The test results may include performances of the composite crystal flooring in terms of a density (ISO23996), a warpage at room temperature (ISO23999), and a diameter of a foaming hole.

(1) When the weight content of the heavy calcium carbonate in the composite calcium is 80%, the weight content of the light calcium carbonate is 20% (i.e., the parts by weight of the heavy calcium carbonate is 32, and the parts by weight of light calcium carbonate is 8), the results of the performance test were obtained as followings. The density was 1.383 g/cm³. The warpage at room temperature was 0.10 millimeters. The diameter of the foaming hole was 160 micrometers.

(2) When the weight content of the heavy calcium carbonate in the composite calcium is 70%, the weight content of the light calcium carbonate is 30% (i.e., the parts by weight of the heavy calcium carbonate is 28, and the parts by weight of light calcium carbonate is 12), the results of the performance test were obtained as followings. The density was 1.381 g/cm³. The warpage at room temperature was 0.15 millimeters. The diameter of the foaming hole was 155 micrometers.

(3) When the weight content of the heavy calcium carbonate in the composite calcium is 60%, the weight content of the light calcium carbonate is 40% (i.e., the parts by weight of the heavy calcium carbonate is 24, and the parts by weight of light calcium carbonate is 16), the results of the performance test were obtained as followings. The density was 1.380 g/cm³. The warpage at room temperature was 0.28 millimeters. The diameter of the foaming hole was 150 micrometers.

(4) When the weight content of the heavy calcium carbonate in the composite calcium is 100%, the weight content of the light calcium carbonate is 00% (i.e., the parts by weight of the heavy calcium carbonate is 40, and the parts by weight of light calcium carbonate is 0), the results of the performance test were obtained as followings. The density was 1.425 g/cm³. The warpage at room temperature was 1.0 millimeters. The diameter of the foaming hole was 180 micrometers.

The experimental data shows that when the components of the first structural layer 110 and the third structural layer 130 are the same, the other components of the second structural layer 120 are the same, and the weight content of the light calcium carbonate and the weight content of the heavy calcium carbonate in the calcium composite of the second structural layer 120 are respectively set to 8 parts by weight and 32 parts by weight, or the weight content of the heavy calcium carbonate is 80% and the weight content of the light calcium carbonate is 20%, the material has a relatively good resistance to warpage at room temperature. When the composite calcium is all heavy calcium carbonate, the density of the composite crystal flooring increases, the stability of the composite crystal flooring decreases, and a cell density of the second structural layer 120 increases. These experimental data of the calcium composite of the second structural layer 120 may be used as a basis of related embodiments.

Embodiment Five

Different weight contents of the heavy calcium carbonate and the hollow glass microbeads in the one or more inorganic fillers in the first structural layer 110 or the third structural layer 130 may have different effects on the performance of the composite crystal flooring. Specifically, the specific effects on the performance may be reflected through the following set of experiments.

In this set of experiments, components in the second structural layer 120 was set as 120 parts by weight of the polyvinyl chloride, 120 parts by weight of the modified fly ash, 20 parts by weight of the composite calcium (i.e., the weight content of the heavy calcium carbonate content was 70%, and the weight content of the light calcium carbonate was 30%), 10 parts by weight of the hollow glass microbeads, 1.0 part by weight of the polyethylene wax, 6.0 parts by weight of the at least one stabilizer (i.e., calcium stearate), 1.1 parts by weight of the stearic acid, 0.9 parts by weight of the yellow foaming agent (i.e., azodicarbonamide), 1.2 parts by weight of the white foaming agent (i.e., sodium bicarbonate), and 15 parts by weight of the at least one foaming regulator (i.e., ethyl acrylate).

Components of the first structural layer 110 and the third structural layer 130 were respectively set as 90 parts by weight of the polyvinyl chloride, 330 parts by weight of the one or more inorganic fillers, 0.4 parts by weight of the polyethylene wax, 3.0 parts by weight of the at least one stabilizer (i.e., calcium stearate), 0.4 parts by weight of the stearic acid, 0.1 parts by weight of the oxidized polyethylene wax, 8 parts by weight of the ABS resin, 15 parts by weight of the at least one plasticizer (i.e., dibutyl phthalate), and 0.4 parts by weight of the carbon black. As used herein, 330 parts by weight of the one or more inorganic fillers included different parts by weight of the heavy calcium carbonate and hollow glass microbeads.

The test results may include performances of the composite crystal flooring in terms of a density (ISO23996), a warpage at room temperature (ISO23999), a heat deflection Vicat temperature, a static bending strength (GB/T17657), an elongation displacement at break, and a thermal dimensional change rate (ISO23999).

As used herein, the warpage at room temperature refers to a degree of distortion of an object when the object is at 23±2 degrees centigrade.

The heat deflection Vicat temperature herein may be understood as a temperature measured by a heat deflection Vicat thermometer.

The static bending strength refers to a ratio of a bending moment and a bending section modulus of an object determined under a maximum load. For example, the static bending strength may be a pressure strength that the first structural layer 110 or the third structural layer 130 can withstand when the first structural layer 110 or the third structural layer 130 is bent to break under a force. The static bending strength may be expressed in Mpa.

The thermal dimensional change rate refers to a change degree of a dimensional of an object after the object is heated at 80 degrees centigrade for 6 hours and then cooled down to 23±2 degrees centigrade.

The elongation displacement at break refers to a displacement that an object passes through when the object is crushed.

The test results were as followings.

(1) When the heavy calcium carbonate was set to 312 parts by weight and the hollow glass microbeads were set to 18 parts by weight, the results of the performance test were obtained as followings. The density was 1.312 g/cm$^3$. The warpage at room temperature was 0.30 millimeters. The heat deflection Vicat temperature was 65 degrees centigrade. The static bending strength was 33 MPa. The elongation displacement at break was 10 millimeters. The thermal dimensional change rate was 0.085%.

(2) When the heavy calcium carbonate was set to 330 parts by weight and the hollow glass microbeads were set to 0 parts by weight, the results of the performance test were obtained as followings. The density was 1.350 g/cm$^3$. The warpage at room temperature was 0.50 millimeters. The heat deflection Vicat temperature was 55 degrees centigrade. The static bending strength was 27 MPa. The elongation displacement at break was 11 millimeters. The thermal dimensional change rate was 0.10%.

(3) When the heavy calcium carbonate was set to 295 parts by weight and the hollow glass microbeads were set to 35 parts by weight, the results of the performance test were obtained as followings. The density was 1.290 g/cm$^3$. The warpage at room temperature was 0.20 millimeters. The heat deflection Vicat temperature was 70 degrees centigrade. The static bending strength was 38 MPa. The elongation displacement at break was 5.5 millimeters. The thermal dimensional change rate was 0.065%.

(4) When the heavy calcium carbonate was set to 290 parts by weight and the hollow glass microbeads were set to 40 parts by weight, the results of the performance test were obtained as followings. The density was 1.285 g/cm$^3$. The warpage at room temperature was 0.18 millimeters. The heat deflection Vicat temperature was 70 degrees centigrade. The static bending strength was 37 MPa. The elongation displacement at break was 4.5 millimeters. The thermal dimensional change rate was 0.15%.

The experimental data shows that when the composition of the second structural layer 120 are the same, the other components of the first structural layer 110 and the third structural layer 130 are the same, and the hollow glass microbeads are within a range of 0 to 35 parts by weight in the 330 parts by weight of the one or more inorganic fillers, as the weight content of the hollow glass microbeads increases, the density decreases, the heat deflection Vicat temperature increases, the static bending strength increases, the warpage at room temperature decreases, the elongation displacement at break decreases, and the thermal dimensional change rate decreases. However, when the weight content of hollow glass microbeads in the one or more inorganic fillers increases to a certain value (e.g., 40 parts by weight), a compatibility and dispersibility between the one or more inorganic fillers and polyvinyl chloride become worse, which not only reduces quality of the product (e.g., thermal stability decreases, the elongation displacement at break reduces, etc.), but also causes the one or more inorganic fillers to be easily aggregated after mixing with polyvinyl chloride. Therefore, it is likely to cause damage (e.g., wear, etc.) to the device for manufacturing the composite crystal flooring. At the same time, when the elongation displacement at break is reduced to below 5.0 millimeters, a brittleness of the composite crystal flooring may increase. Therefore, a brittle rupture may easily occur. When the weight content of the heavy calcium carbonate is set to 295 parts by weight and the weight content of hollow glass beads is set to 35 parts by weight in 330 parts by weight of the one or more inorganic fillers, the material has a relatively good resistance to warpage at room temperature and a relatively good static bending strength. The thermal dimensional change rate is relatively low. The performance of the material is better than those of other experiments. These experimental data of inorganic fillers (heavy calcium carbonate and hollow glass microbeads) may be used as a basis of related embodiments.

Embodiment Six

Different weight contents of the ABS resin in the first structural layer 110 and/or the third structural layer 130 may have different effects the of performance of the composite crystal flooring. Specifically, the specific effects on the performance may be reflected through the following set of experiments.

In this set of experiments, components in the second structural layer 120 were set as 120 parts by weight of the polyvinyl chloride, 120 parts by weight of the modified fly ash, 20 parts by weight of the composite calcium (i.e., the weight content of the heavy calcium carbonate was 70%, and the weight content of the light calcium carbonate was 30%), 10 parts by weight of the hollow glass microbeads, 1.0 parts by weight of the polyethylene wax, 6.0 parts by weight of the at least one stabilizer (i.e., calcium stearate), 1.1 parts by weight of the stearic acid, 0.9 parts by weight of the yellow foaming agent, 1.2 parts by weight of the white foaming agent, and 15 parts by weight of the at least one foaming regulator (i.e., ethyl acrylate).

Components of the first structural layer 110 and the third structural layer 130 were respectively set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the at least one stabilizer (i.e., calcium stearate), 0.4 parts by weight of the stearic acid, 0.1 parts by weight of the oxidized polyethylene wax, 15 parts by weight of the at least one plasticizer (i.e., dibutyl phthalate), 0.4 parts by weight of the carbon black, different parts by weight of the ABS resin, and the same parts by weight of the ABS resin and acrylic (ACR).

The test results may include performances of the composite crystal flooring in terms of a heat deflection Vicat temperature, a static bending strength (GB/T17657), and an elongation displacement at break.

The test results are as followings.

(1) When the weight content of the ABS resin is set to 8 parts by weight, the results of the performance test were obtained as followings. The heat deflection Vicat temperature was 70 degrees centigrade. The static bending strength was 33 MPa. The elongation displacement at break was 10 millimeters.

(2) When the weight content of the ABS resin is set to 9 parts by weight, the results of the performance test were obtained as followings. The heat deflection Vicat temperature was 70 degrees centigrade. The static bending strength was 35 MPa. The elongation displacement at break was 10.3 millimeters.

(3) When the weight content of the ABS resin is set to 10 parts by weight, the results of the performance test were obtained as followings. The heat deflection Vicat temperature was 70 degrees centigrade. The static bending strength was 38 MPa. The elongation displacement at break was 10.5 millimeters.

(4) When the weight content of the ABS resin is set to 15 parts by weight, the results of the performance test were obtained as followings. The heat deflection Vicat temperature was 70 degrees centigrade. The static bending strength was 38 MPa. The elongation displacement at break was 10.3 millimeters.

(4) When the ABS resin is replaced with ACR, that is, when the weight content of the ACR is set to 10 parts by weight, the results of the performance test were obtained as followings. The heat deflection Vicat temperature was 55 degrees centigrade. The static bending strength was 28 MPa. The elongation displacement at break was 12 millimeters.

The experimental data shows that when the composition of the second structural layer 120 is the same, the other components of the first structural layer 110 or the third structural layer 130 are the same, and the weight content of the ABS resin is within a range of 8 to 10 parts by weight, the material has a relatively good static bending strength and a relatively high heat deflection Vicat temperature. When the weight content of the ABS resin exceeds 10 parts by weight (e.g., 15 parts by weight), the performance of the composite crystal flooring does not change significantly. At the same time, it also shows that the performance of the composite crystal flooring formed by mixing the ABS resin and polyvinyl chloride is significantly better than that of the composite crystal flooring formed by mixing ACR and polyvinyl chloride. These experimental data of the ABS resin may be used as a basis of related embodiments.

Embodiment Seven

Different weight contents of the one or more inorganic fillers and the foaming agent in the second structural layer 120 may have different effects on the performance of the composite crystal flooring. Specifically, the specific effects on the performance may be reflected through the following set of experiments.

In this set of experiments, components in the first structural layer 110 and the third structural layer 130 were set as 90 parts by weight of the polyvinyl chloride, 312 parts by weight of the heavy calcium carbonate, 18 parts by weight of the hollow glass microbeads, 0.4 parts by weight of the polyethylene wax, 3.0 parts by weight of the at least one stabilizer, 0.4 parts by weight of the stearic acid, 0.1 parts by weight of the oxidized polyethylene wax, 8 parts by weight of the ABS resin, 0.4 parts by weight of the carbon black, and 15 parts by weight of the at least one plasticizer.

Components in the second structural layer 120 were set as 100 parts by weight of the polyvinyl chloride, 1.0 parts by weight of the polyethylene wax, 8.0 parts by weight of the at least one stabilizer (i.e., calcium stearate), 1.1 parts by weight of the stearic acid, 15 parts by weight of the at least one foaming regulator (i.e., ethyl acrylate), and different parts by weight of the one or more inorganic fillers and the at least one foaming agent.

The test results may include performances of the composite crystal flooring in terms of a density (ISO23996) and a diameter of a foaming hole.

(1) When the parts by weight of the one or more inorganics filler is 100, wherein the modified fly ash is set to 50 parts by weight, the composite calcium (i.e., the weight content of the heavy calcium carbonate was 70%, and the weight content of the light calcium carbonate was 30%) is set to 40 parts by weight, and the hollow glass microbeads is set to 10 parts by weight, and the at least one foaming agent is set to 1.8 parts by weight (i.e., 0.6 parts by weight of the yellow foaming agent and 1.2 parts by weight of the white foaming agent), the results of the performance test were obtained as followings. The density was 1.450 g/cm$^3$. The diameter of the foaming hole was 140 micrometers.

(2) When the parts by weight of the one or more inorganic fillers is 150, wherein the modified fly ash is set to 100 parts by weight, the composite calcium (i.e., the weight content of the heavy calcium carbonate was 70%, and the weight content of the light calcium carbonate was 30%) is set to 40 parts by weight, and the hollow glass microbeads is set to 10 parts by weight, and the at least one foaming agent is set to 1.95 parts by weight (i.e., 0.75 parts by weight of the yellow foaming agent and 1.2 parts by weight of the white foaming agent), the results of the performance test were obtained as followings. The density was 1.430 g/cm$^3$. The diameter of the foaming hole was 145 micrometers.

(3) When the parts by weight of the one or more inorganic fillers is 200, wherein the modified fly ash is set to 150 parts by weight, the composite calcium (i.e., the weight content of the heavy calcium carbonate was 70%, and the weight content of the light calcium carbonate was 30%) is set to 40 parts by weight, and the hollow glass microbeads is set to 10 parts by weight, and the at least one foaming agent is set to 2.1 parts by weight (i.e., 0.9 parts by weight of the yellow foaming agent and 1.2 parts by weight of the white foaming agent), the results of the performance test were obtained as followings. The density was 1.380 g/cm$^3$. The diameter of the foaming hole was 150 micrometers.

(4) When the parts by weight of the one or more inorganic fillers is 200, wherein the modified fly ash is set to 200 parts by weight, the composite calcium is set to 0 parts by weight, and the hollow glass microbeads is set to 0 parts by weight, and the at least one foaming agent is set to 2.0 parts by weight (i.e., 0.9 parts by weight of the yellow foaming agent and 1.1 parts by weight of the white foaming agent), the results of the performance test were obtained as followings. The density was 1.392 g/cm$^3$. The diameter of the foaming hole was 149 micrometers.

(5) When the parts by weight of the one or more inorganic fillers is 200, wherein the modified fly ash is set to 200 parts by weight, the composite calcium is set to 0 parts by weight, and the hollow glass microbeads is set to 0 parts by weight, and the at least one foaming agent is set to 1.9 parts by weight (i.e., 0.9 parts by weight of the yellow foaming agent and 1.0 parts by weight of the white foaming agent), the results of the performance test were obtained as followings. The density was 1.425 g/cm$^3$. The diameter of the foaming hole was 149 micrometers.

(6) When the parts by weight of the one or more inorganic fillers is 300, wherein the modified fly ash is set to 300 parts by weight, the composite calcium is set to 0 parts by weight, and the hollow glass microbeads is set to 0 parts by weight, and the at least one foaming agent is set to 2.0 parts by weight (i.e., 0.9 parts by weight of the yellow foaming agent and 1.1 parts by weight of the white foaming agent), the second structural layer did not foam, indicating that an amount of the at least one foaming agent was not enough to play a foaming effect.

(7) When the parts by weight of the one or more inorganic fillers is 200, wherein the modified fly ash is set to 200 parts by weight, the composite calcium is set to 0 parts by weight, and the hollow glass microbeads is set to 0 parts by weight, and the foaming agent is set to 3.0 parts by weight (i.e., 1.9 parts by weight of the yellow foaming agent and 1.1 parts by weight of the white foaming agent), foaming and gas escape occurred during the foaming process, indicating that an amount of the foaming agent was too much. Therefore, a relatively good structure of the second structural layer cannot be obtained.

The experimental data shows that when the components of the first structural layer 110 and the third structural layer 130 are the same, and the other components of the second structural layer 120 are the same, the amount of one or more inorganic fillers in the second structural layer 120 needs to be matched with the amount of foaming agent. If the amount of foaming agent is insufficient, it may cause that the second structural layer 120 may not foam. If the amount of foaming agent is too large, it may cause that the foaming and gas escape occur during the foaming process, and a relatively good structure of the second structural layer cannot be obtained.

The weight content of the modified fly ash in the second structural layer 120 may affect the density and the diameter of the foaming hole. For example, when the weight contents of composite calcium, hollow glass microbeads, and white foaming agent are controlled to be constant, as increasing the weight content of modified fly ash, the amount of yellow foaming agent may need to be increased accordingly. For instance, when the weight content of modified fly ash is controlled to be constant, the more the amount of the yellow foaming agent and the white foaming agent, the lower the density of the obtained composite crystal flooring. These experimental data of the content of one or more inorganic fillers and foaming agent may be used as a basis of related examples.

The beneficial effects of the embodiments of the present disclosure may include but not be limited to the following beneficial effects. (1) The first structural layer and/or the third structural layer may include the hollow glass microbeads and the heavy calcium carbonate, which may improve the thermal stability and rigidity of the composite crystal flooring. Therefore, the composite crystal flooring may have a relatively good creep resistance. (2) The second structural layer may include the modified fly ash, the hollow glass microbeads, and the composite calcium, which may reduce the density of composite crystal flooring and improve the thermal stability and rigidity of the composite crystal flooring. (3) The device may adopt the heat-conducting oil sizing sleeve to cooperate with the set of cooling rollers and the set of calendaring rollers to ensure that the cells do not break. While sizing a substrate surface, the coextrusion substrate surface may keep a certain temperature. Therefore, heat compounding and pressing the materials through one-step forming may be achieved, which may make the processing of composite crystal flooring easier and further reduce the manufacturing costs.

It should be noted that different embodiments may provide different beneficial effects. In different embodiments, the possible beneficial effects may be any one or a combination of the above, or any other beneficial effects can be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A composite crystal flooring, having a multi-layer structure, comprising:
a substrate layer, the substrate layer including at least a first structural layer, a second structural layer, and a third structural layer, the second structural layer being located between the first structural layer and the third structural layer, wherein
a foaming density of the second structural layer is less than 1.1 grams per cubic millimeter, and
components of the second structural layer includes polyvinyl chloride, one or more inorganic fillers, at least one foaming agent, at least one foaming regulator, at least one lubricating agent, and at least one stabilizer; wherein
the one or more inorganic fillers include 81 to 89 parts by weight of modified fly ash, 3 to 7 parts by weight of hollow glass microbeads, and 8 to 12 parts by weight of composite calcium.

2. The composite crystal flooring of claim 1, wherein the components of the second structural layer include 90 to 110 parts by weight of the polyvinyl chloride, 100 to 200 parts by weight of the one or more inorganic fillers, 1.6 to 2.1 parts by weight of the at least one foaming agent, 12 to 15 parts by weight of the at least one foaming regulator, 1.7 to 2.1 parts by weight of the at least one lubricating agent, and 6.0 to 8.0 parts by weight of the at least one stabilizer.

3. The composite crystal flooring of claim 2, wherein the at least one lubricating agent includes an internal lubricating agent and an external lubricating agent; wherein
the internal lubricating agent includes stearic acid, parts by weight of the stearic acid being within a range of 0.9 to 1.1; and
the external lubricating agent includes polyethylene wax, parts by weight of the polyethylene wax being within a range of 0.8 to 1.0.

4. The composite crystal flooring of claim 1, wherein the modified fly ash includes microbeads, a weight content of the microbeads in the modified fly ash being within a range of 40% to 60%, and a mesh number of the modified fly ash being within a range of 325 to 400.

5. The composite crystal flooring of claim 1, wherein components of the composite calcium include at least heavy calcium carbonate and light calcium carbonate, a mesh number of the heavy calcium carbonate being within a range of 800 to 1250, a mesh number of the light calcium carbonate being within a range of 800 to 1250, a weight content of the heavy calcium carbonate being within a range of 60% to 80%, and a weight content of the light calcium carbonate being within a range of 20% to 40%.

6. The composite crystal flooring of claim 1, wherein the at least one foaming agent includes a yellow foaming agent and a white foaming agent, the yellow foaming agent including azodicarbonamide, and the white foaming agent including sodium bicarbonate.

7. The composite crystal flooring of claim 1, wherein the at least one foaming regulator includes acrylics.

8. The composite crystal flooring of claim 1, wherein when a temperature change is less than 80 degrees centigrade, a degree of deformation of the first structural layer and a degree of deformation of the third structural layer are less than 0.065%.

9. The composite crystal flooring of claim 1, wherein components of the first structural layer includes polyvinyl chloride, one or more inorganic fillers, at least one lubricating agent, at least one stabilizer, acrylonitrile butadiene styrene (ABS) resin, and at least one plasticizer; wherein
components of the one or more inorganic fillers of the first structural layer include at least one of heavy calcium carbonate or the hollow glass microbeads, wherein a ratio of parts by weight of the hollow glass microbeads to parts by weight of the one or more inorganic fillers is not greater than 35%.

10. The composite crystal flooring of claim 9, wherein the first structural layer includes 90 to 110 parts by weight of the polyvinyl chloride, 270 to 330 parts by weight of the one or more inorganic fillers, 0.8 to 2.6 parts by weight of the at least one lubricating agent, 3.0 to 6.0 parts by weight of the at least one stabilizer, 8 to 10 parts by weight of the ABS resin, and 5 to 15 parts by weight of the at least one plasticizer.

11. The composite crystal flooring of claim 1, wherein components of the third structural layer includes polyvinyl chloride, one or more inorganic fillers, at least one lubricating agent, at least one stabilizer, acrylonitrile butadiene styrene (ABS) resin, and at least one plasticizer; wherein
components of the one or more inorganic fillers of the third structural layer include at least one of heavy calcium carbonate or the hollow glass microbeads, wherein a ratio of parts by weight of the hollow glass microbeads to parts by weight of the one or more inorganic fillers is not greater than 35%.

12. The composite crystal flooring of claim 11, wherein the third structural layer includes 90 to 110 parts by weight of the polyvinyl chloride, 270 to 330 parts by weight of the one or more inorganic fillers, 0.8 to 2.6 parts by weight of the at least one lubricating agent, 3.0 to 6.0 parts by weight of the at least one stabilizer, 8 to 10 parts by weight of the ABS resin, and 5 to 15 parts by weight of the at least one plasticizer.

13. The composite crystal flooring of claim 1, wherein the composite crystal flooring further includes a decorative layer disposed on the substrate layer, the decorative layer including at least one of an ultraviolet (UV) coating layer, a wear-resistant layer, or a color film layer.

14. The composite crystal flooring of claim 1, wherein a density of the composite crystal flooring is within a range of 1.285 to 1.45 grams per cubic millimeter.

15. The composite crystal flooring of claim 1, wherein when a temperature returns to 23±2 degrees centigrade after the composite crystal flooring is heated at 80 degrees centigrade for 6 hours, a thermal dimensional change rate of the composite crystal flooring is with a range of 0.065% to 0.15%.

16. A method for manufacturing the composite crystal flooring of claim 1, comprising:
pretreating raw materials of the first structural layer, the second structural layer, and the third structural layer, respectively;
sending the pretreated raw materials of the first structural layer, the second structural layer, and the third structural layer into a coextrusion extruder; and
forming a semi-manufactured product of the substrate layer by coextruding and foaming the pretreated raw materials.

17. The method for manufacturing the composite crystal flooring of claim 16, wherein the method further includes performing a cooling and pre-sizing treatment on the semi-manufactured product of the substrate layer.

18. The method for manufacturing the composite crystal flooring of claim 16, wherein the method further includes:
heating the substrate layer to a third preset temperature using infrared after the substrate layer is treated by a set of calendaring rollers.

19. The method for manufacturing the composite crystal flooring of claim 18, wherein the method further includes:
obtaining the composite crystal flooring by rolling the substrate layer heated to the third preset temperature using infrared, the color film layer, and the wear-resistant layer using the calendaring rollers through one-step forming.

* * * * *